(12) United States Patent
Toth et al.

(10) Patent No.: US 12,319,206 B2
(45) Date of Patent: Jun. 3, 2025

(54) INTERIOR CAMERA SYSTEM FOR A SELF DRIVING CAR

(71) Applicant: WAYMO LLC, Mountain View, CA (US)

(72) Inventors: Kimberly Toth, Sunnyvale, CA (US); Giulia Guidi, Mountain View, CA (US); Choon Ping Chng, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/425,071

(22) Filed: Jan. 29, 2024

(65) Prior Publication Data

US 2024/0166144 A1 May 23, 2024

Related U.S. Application Data

(63) Continuation of application No. 18/100,090, filed on Jan. 23, 2023, now Pat. No. 11,904,779, which is a
(Continued)

(51) Int. Cl.
*B60Q 1/00* (2006.01)
*B60R 11/04* (2006.01)
(Continued)

(52) U.S. Cl.
CPC ............ *B60R 11/04* (2013.01); *G05D 1/0088* (2013.01); *G05D 1/228* (2024.01); *G06V 10/141* (2022.01); *G06V 20/59* (2022.01); *G08B 21/24* (2013.01); *H04N 5/58* (2013.01); *H04N 23/56* (2023.01); *B60R 2300/103* (2013.01); *B60R 2300/105* (2013.01); *B60R 2300/8006* (2013.01)

(58) Field of Classification Search
CPC .. G06K 9/00832; G08B 21/24; H04N 5/2256; H04N 5/58; G05D 1/0088; G05D 2201/0213; B60R 1/00; B60R 2300/8006; B60R 2300/103; B60R 2300/105
See application file for complete search history.

(56) References Cited

U.S. PATENT DOCUMENTS 10,290,158 B2   5/2019   Jales Costa et al.
10,303,961 B1   5/2019   Stoffel et al.
(Continued)

*Primary Examiner* — Toan N Pham
(74) *Attorney, Agent, or Firm* — Botos Churchill IP Law

(57) ABSTRACT

The technology provides an interior camera sensing system for self-driving vehicles. The sensor system includes image sensors and infrared illuminators to see the vehicle's cabin and storage areas in all ambient lighting conditions. The system can monitor the vehicle for safety purposes, to detect the cleanliness of the cabin and storage areas, as well as to detect whether packages or other objects have been inadvertently left in the vehicle. The cameras are arranged to focus on selected regions in the vehicle cabin and the system carries out certain actions in response to information evaluated for those regions. The interior space is divided into multiple zones assigned different coverage priorities. Regardless of vehicle size or configuration, certain actions are performed according to various ride checklists and the imagery detected by the interior cameras. The checklists include pre-ride, mid-ride, and post-ride checklists.

22 Claims, 19 Drawing Sheets

Related U.S. Application Data continuation of application No. 17/239,972, filed on Apr. 26, 2021, now Pat. No. 11,587,334, which is a continuation of application No. 16/718,462, filed on Dec. 18, 2019, now Pat. No. 11,017,248.

(51) Int. Cl.

| | |
|---|---|
| *G05D 1/00* | (2006.01) |
| *G05D 1/228* | (2024.01) |
| *G06V 10/141* | (2022.01) |
| *G06V 20/59* | (2022.01) |
| *G08B 21/24* | (2006.01) |
| *H04N 5/58* | (2006.01) |
| *H04N 23/56* | (2023.01) |

(56) References Cited

U.S. PATENT DOCUMENTS

| | | |
|---|---|---|
| 10,739,149 B2 | 8/2020 | Chase et al. |
| 11,106,927 B2* | 8/2021 | Reiley ............... G08B 5/36 |
| 11,587,334 B2 | 2/2023 | Toth et al. |
| 2017/0291548 A1 | 10/2017 | Kim et al. |
| 2018/0126960 A1 | 5/2018 | Reibling et al. |
| 2019/0197325 A1 | 6/2019 | Reiley et al. |
| 2019/0258263 A1 | 8/2019 | Wendel et al. |
| 2019/0370575 A1* | 12/2019 | Nandakumar .. B60W 60/00253 |
| 2020/0010051 A1 | 1/2020 | Dumov |
| 2020/0050199 A1 | 2/2020 | Park et al. |
| 2020/0242421 A1 | 7/2020 | Sobhany |
| 2020/0365140 A1* | 11/2020 | Jales Costa ......... G05D 1/0231 |
| 2021/0372942 A1* | 12/2021 | Park .................. G01N 21/94 |
| 2022/0036720 A1* | 2/2022 | Woo .................. H04N 23/60 |

* cited by examiner

INTERIOR CAMERA SYSTEM FOR A SELF DRIVING CAR

CROSS REFERENCE TO RELATED APPLICATIONS

The present application is a continuation of U.S. patent application Ser. No. 18/100,090, filed Jan. 23, 2023, and issued as U.S. Pat. No. 11,904,779 on Feb. 20, 2024, which is a continuation of U.S. patent application Ser. No. 17/239,972, filed Apr. 26, 2021, and issued as U.S. Pat. No. 11,587,334 on Feb. 21, 2023, which is continuation of U.S. patent application Ser. No. 16/718,462, filed Dec. 18, 2019 and issued as U.S. Pat. No. 11,017,248 on May 25, 2021, the entire disclosures of which are incorporated herein by reference.

BACKGROUND

Autonomous vehicles, such as vehicles that do not require a human driver, can be used to aid in the transport of passengers from one location to another. Such vehicles may operate in a fully autonomous mode without a person providing driving input, or in a partially autonomous mode with a driver having control over one or more aspects of vehicle operation.

BRIEF SUMMARY

The technology relates to an interior sensor system for use with vehicles that can operate in an autonomous driving mode. The sensor system includes visible and near infrared (IR) sensors to see the vehicle's cabin in all ambient lighting conditions. According to certain aspects, the system can be used to monitor occupants for safety purposes, including whether seatbelts are being worn properly. It can also be used to detect the cleanliness of the cabin and storage areas, for instance to schedule maintenance or service should the vehicle need to be cleaned. In addition to this, the in-vehicle sensor system can be used for rider support, including providing a videoconference capability with a remote assistance service, as well as to detect whether packages or other objects have been inadvertently left in the vehicle, whether a person is near the open trunk before closing the trunk lid, whether a passenger or pet has a hand, paw or other appendage outside an open window, etc.

According to one aspect, an interior sensing system for a vehicle configured to operate in an autonomous driving mode is provided. The interior sensing system includes a plurality of image sensors disposed along different surfaces within an interior area of the vehicle. The plurality of image sensors are configured to capture images of the interior area of the vehicle. The system also includes one or more infrared units configured to illuminate one or more zones within the vehicle during image capture by the plurality of image sensors, as well as a control system operatively coupled to the plurality of image sensors and the one or more infrared units. The control system includes one or more processors configured to initiate image capture by the plurality of image sensors in accordance with a predetermined ride checklist, receive captured imagery from the plurality of image sensors in response to the predetermined ride checklist, perform processing of the received imagery to detect a current status of the interior area of the vehicle based on detected objects or conditions within the vehicle, and cause one or more systems of the vehicle to perform an action based on the current status of the interior area of the vehicle. The predetermined ride checklist may be selected from a pre-ride checklist, a mid-ride checklist, and a post-ride checklist based on a current ride status.

The control system may be further configured to determine an amount of ambient light, and to actuate the one or more infrared units in response to the determined amount of ambient light. Here, when the predetermined ride checklist is a mid-ride checklist and the determined amount of ambient light is below a threshold level, the control system may be configured to prevent illumination by one or more interior visible cabin lights.

In one scenario, the plurality of image sensors is disposed along different surfaces within the interior area of the vehicle to obtain imagery from a plurality of zones within the vehicle. The plurality of zones may be ranked according to multiple priority levels. At least one of an image capture rate and an image resolution in each of the plurality of zones may be based on the priority level corresponding to the zones. A field of view for a given one of the plurality of image sensors focused on a selected zone may be based on the priority level for the selected zone.

In another scenario, the predetermined ride checklist is a pre-ride checklist and the current status indicates that there is an object in the vehicle or service is required. Here, the control system is configured to cause a communication system of the vehicle to perform the action of contacting a remote facility to service the vehicle or remove the object. Contacting the remote facility to service the vehicle may include a request to either clean the vehicle or to reset a vehicle component to a default setting.

In a further scenario, when the predetermined ride checklist is a post-ride checklist and the current status indicates that there is an object in the vehicle from a prior passenger, the control system is configured to cause a communication system of the vehicle to contact a remote facility to remove the object from the vehicle, contact the prior passenger regarding the object in the vehicle, or contact both the remote facility and the prior passenger regarding the object in the vehicle. Contacting the prior passenger may include informing the prior passenger what type of object was left in the vehicle and where the object can be retrieved.

In an example, causing one or more systems of the vehicle to perform the action based on the current status of the interior area of the vehicle includes causing a planning system of the vehicle to plan a change in route. Each of the one or more infrared units may be collocated with a corresponding one of the plurality of image sensors. Alternatively, each of the one or more infrared units may be located separately from the plurality of image sensors and arranged to avoid flare during image capture by the plurality of image sensors. At least one of the one or more infrared units may be further configured to provide illumination in at least part of the visible light spectrum.

In another example, initiation of the image capture by at least one of the plurality of image sensors includes performing high dynamic range image capture using a plurality of different exposure levels. And processing of the received imagery to detect the current status may include the one or more processors performing a machine learning operation to determine whether a given one of the plurality of image sensors requires cleaning or if there is an obstruction of the given image sensor.

According to another aspect, a method of controlling an interior sensing system for a vehicle configured to operate in an autonomous driving mode is provided. The method comprises initiating, by one or more processors, image capture by the plurality of image sensors in accordance with a predetermined ride checklist, the predetermined ride checklist being stored in memory of a control system of the vehicle; in response to the predetermined ride checklist, the one or more processors receiving captured imagery from a plurality of image sensors disposed along different surfaces within an interior area of the vehicle, the plurality of image sensors being configured to capture images of the interior area of the vehicle; the one or more processors performing processing of the received imagery to detect a current status of the interior area of the vehicle based on detected objects or conditions within the vehicle; and the one or more processors causing one or more systems of the vehicle to perform an action based on the current status of the interior area of the vehicle.

In one example, the method further comprises determining an amount of ambient light; actuating one or more infrared units disposed within the interior area of the vehicle in response to determining the amount of ambient light; and when the predetermined ride checklist is a mid-ride checklist and the determined amount of ambient light is below a threshold level, preventing illumination by one or more interior visible cabin lights.

DETAILED DESCRIPTION

The interior camera system according to the present technology is able to focus on selected regions in the vehicle cabin and carry out certain actions in response to information evaluated for those regions. In an ideal arrangement, the sensor system would have fields of view (FOV) capable of covering all interior cabin areas. However, this may not be feasible due to cost, complexity or other constraints. Thus, the cabin can be divided into multiple zones, where the zones may be assigned different coverage priorities. The number of zones that may be employed can depend on the type of vehicle. For instance, a minivan may have more zones than a two-door sports car because it has an additional row of seats and/or additional storage areas. Regardless of the vehicle size or configuration, there are certain threshold requirements to be met or operations to perform when the vehicle is on the way to pick up a passenger, when the passenger is being driven to a destination, and once the passenger exists the vehicle. These and other features are discussed below.

Example Vehicle Systems

Figure 1A:
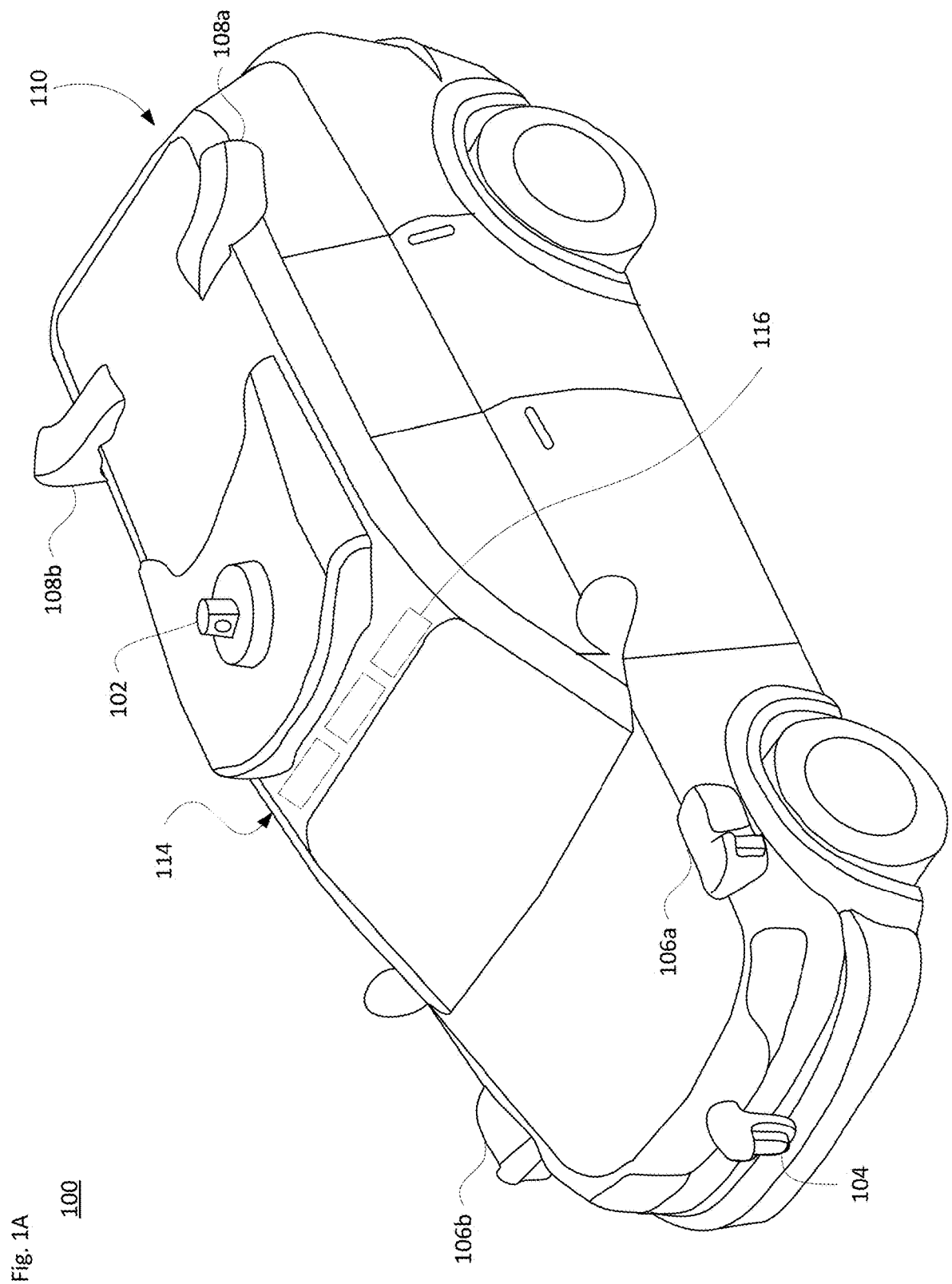
FIGS. 1A-B illustrate an example passenger-type vehicle configured for use with aspects of the technology.
Figure 1B:
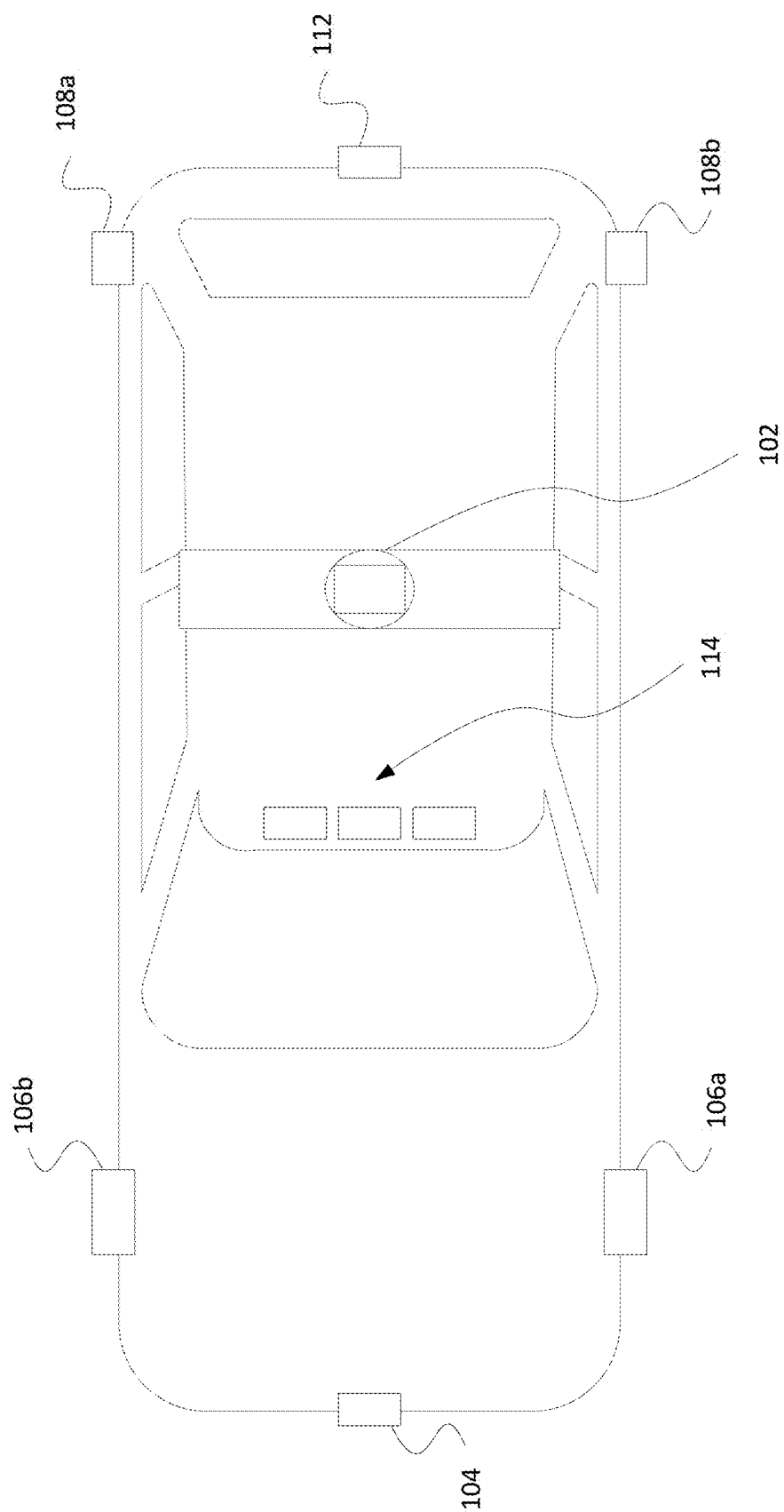

FIG. 1A illustrates a perspective view of an example passenger vehicle 100, such as a minivan, sport utility vehicle (SUV) or other vehicle. FIG. 1B illustrates a top-down view of the passenger vehicle 100. As shown, the passenger vehicle 100 includes various external sensors for obtaining information about the vehicle's outside environment, which enable the vehicle to operate in an autonomous driving mode. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle, may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

By way of example, each external sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
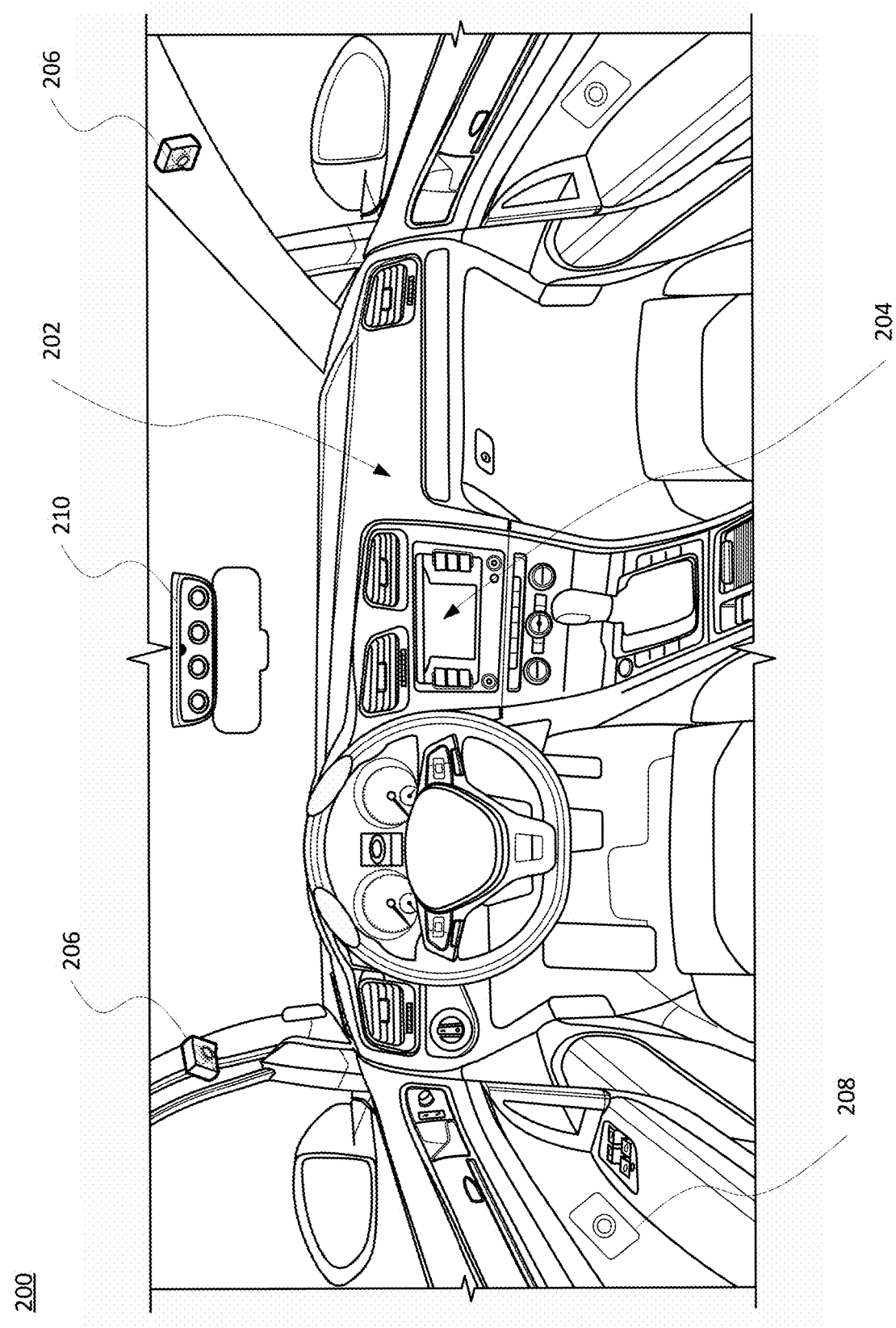
FIG. 2 illustrates in interior view of the vehicle of FIGS. 1A-B in accordance with aspects of the technology.

Turning to FIG. 2, this figure illustrates an example view 200 within the cabin of the vehicle 100, for instance as seen from the front seats. In this view, a dashboard or console area 202 which includes an internal electronic display 204 is visible. Although vehicle 100 includes a steering wheel, gas (acceleration) pedal, or brake (deceleration) pedal which would allow for a semiautonomous or manual driving mode where a passenger would directly control the steering, acceleration and/or deceleration of the vehicle via the drivetrain, these inputs are not necessary for a fully autonomous driving mode. Rather, passenger input may be provided by interaction with the vehicle's user interface system and/or a wireless network connection for an app on the passenger's mobile phone or other personal computing device. By way of example, the internal electronic display 204 may include a touch screen or other user input device for entering information by a passenger such as a destination, etc. Alternatively, internal electronic display 204 may merely provide information to the passenger(s) and need not include a touch screen or other interface for user input.

Also shown in FIG. 2 are sensor units 206, 208 and 210, which may be located at different places within the cabin and storage areas. The sensor units may each include one or more cameras (e.g., optical and/or IR imaging devices, high dynamic range (HDR)-capable cameras, etc.), time of flight sensors, IR illuminators, microphones, pressure sensors or other sensors. Information obtained from the sensors can be sent to an onboard computer system for processing and/or analysis in real time to determine, e.g., a state of the vehicle include seating locations for any passengers, whether there are packages or other objects on a seat, on the floor, in a cupholder, etc. The obtained information may be first processed partially or fully by the sensor unit, or raw or partially processed data may be sent to the onboard computer system. For instance, an HDR camera captures multiple images having different exposure levels at the same time (e.g., 2-4 images). The camera sensor unit may pre-process the images to obtain a single image that is then sent to the computer system for further image processing. Based on this information the vehicle may take certain actions or communicate with a remote system that can schedule a service or provide assistance. By way of example, a neural network evaluating the camera images may determine whether the camera requires cleaning or if there is an obstruction of the camera. In the first situation, the computer system may actuate a cleaning element such as a wiper to clean the camera lens. In the second situation, a service call may be required to correct the obstruction.

Figure 3:
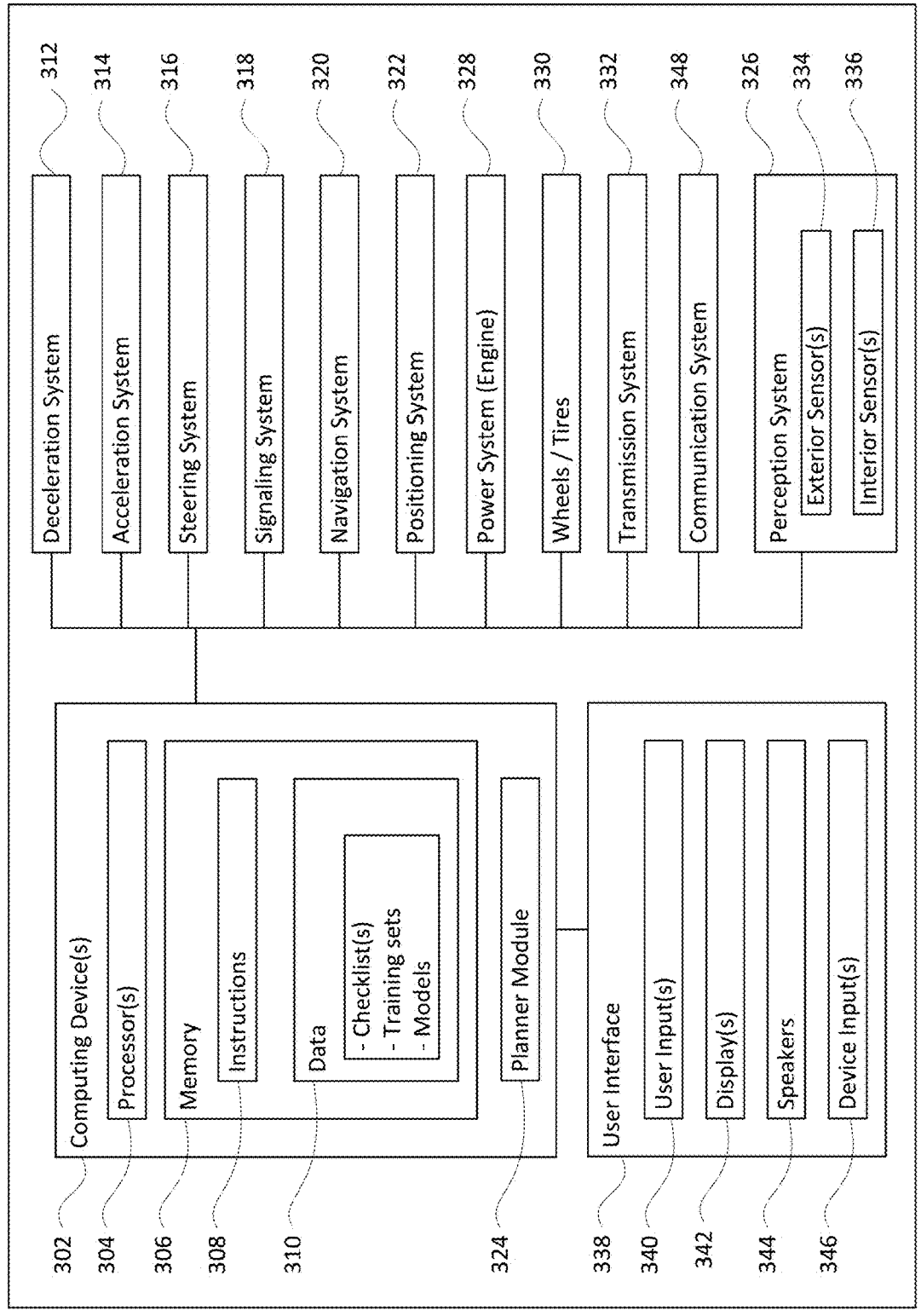
FIG. 3 is a block diagram of systems of an example vehicle in accordance with aspects of the technology.

FIG. 3 illustrates a block diagram 300 with various components and systems of an exemplary vehicle, such as passenger vehicle 100, to operate in an autonomous driving mode. As shown, the block diagram 300 includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The computing system may control overall operation of the vehicle when operating in an autonomous driving mode.

The memory 306 stores information accessible by the processors 304, including instructions 308 and data 310 that may be executed or otherwise used by the processors 304. The memory 306 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 308 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 310 may be retrieved, stored or modified by one or more processors 304 in accordance with the instructions 308. In one example, some or all of the memory 306 may be an event data recorder or other secure data storage system configured to store vehicle diagnostics and/or obtained sensor data, which may be on board the vehicle or remote, depending on the implementation. The data may include, for instance, inspection or operating checklists or other use cases that can be used pre-ride, in-ride and/or post-ride. The data may also include training sets, object models or other information to perform object recognition for different types of objects (e.g., passengers, pets or service animals, bags or other packages, mobile phones or other personal computer devices, etc.)

The processors 304 may be any conventional processors, such as commercially available CPUs. Alternatively, each processor may be a dedicated device such as an ASIC or other hardware-based processor. Although FIG. 3 functionally illustrates the processors, memory, and other elements of computing devices 302 as being within the same block, such devices may actually include multiple processors, computing devices, or memories that may or may not be stored within the same physical housing. Similarly, the memory 306 may be a hard drive or other storage media located in a housing different from that of the processor(s) 304. Accordingly, references to a processor or computing device will be understood to include references to a collection of processors or computing devices or memories that may or may not operate in parallel.

In one example, the computing devices 302 may form an autonomous driving computing system incorporated into vehicle 100. The autonomous driving computing system is configured to communicate with various components of the vehicle. For example, the computing devices 302 may be in communication with various systems of the vehicle, including a driving system including a deceleration system 312 (for controlling braking of the vehicle), acceleration system 314 (for controlling acceleration of the vehicle), steering system 316 (for controlling the orientation of the wheels and direction of the vehicle), signaling system 318 (for controlling turn signals), navigation system 320 (for navigating the vehicle to a location or around objects) and a positioning system 322 (for determining the position of the vehicle, e.g., including the vehicle's pose). The autonomous driving computing system may employ a planner module 324, in accordance with the navigation system 320, the positioning system 322 and/or other components of the system, e.g., for determining a route from a starting point to a destination or for making modifications to various driving aspects in view of current or expected traction conditions.

The computing devices 302 are also operatively coupled to a perception system 326 (for detecting objects in the vehicle's internal and external environments), a power system 328 (for example, a battery and/or gas or diesel powered engine) and a transmission system 332 in order to control the movement, speed, etc., of the vehicle in accordance with the instructions 308 of memory 306 in an autonomous driving mode which does not require or need continuous or periodic input from a passenger of the vehicle. Some or all of the wheels/tires 330 are coupled to the transmission system 332, and the computing devices 32 may be able to receive information about tire pressure, balance and other factors that may impact driving in an autonomous mode.

The computing devices 302 may control the direction and speed of the vehicle, e.g., via the planner module 324, by controlling various components. By way of example, computing devices 302 may navigate the vehicle to a destination location completely autonomously using data from the map information and navigation system 320. Computing devices 302 may use the positioning system 322 to determine the vehicle's location and the perception system 326 to detect and respond to objects when needed to reach the location safely. In order to do so, computing devices 302 may cause the vehicle to accelerate (e.g., by increasing fuel or other energy provided to the engine by acceleration system 314), decelerate (e.g., by decreasing the fuel supplied to the engine, changing gears, and/or by applying brakes by deceleration system 312), change direction (e.g., by turning the front or other wheels of vehicle 100 by steering system 316), and signal such changes (e.g., by lighting turn signals of signaling system 318). Thus, the acceleration system 314 and deceleration system 312 may be a part of a drivetrain or other type of transmission system 332 that includes various components between an engine of the vehicle and the wheels of the vehicle. Again, by controlling these systems, computing devices 302 may also control the transmission system 332 of the vehicle in order to maneuver the vehicle autonomously.

Navigation system 320 may be used by computing devices 302 in order to determine and follow a route to a location. In this regard, the navigation system 320 and/or memory 306 may store map information, e.g., highly detailed maps that computing devices 302 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

By way of example only, the perception system 326 may include one or more light detection and ranging (lidar) sensors, radar units, cameras (e.g., optical and/or IR imaging devices, with or without a neutral-density filter (ND) filter), positioning sensors (e.g., gyroscopes, accelerometers and/or other inertial components), acoustical sensors (e.g., microphones or sonar transducers), and/or any other detection devices. In addition, IR illuminators may also be employed in conjunction with the cameras, for instance to illuminate within the cabin or immediately adjacent to the vehicle. Such sensors of the perception system 326 may detect objects outside of the vehicle and their characteristics such as location, orientation, size, shape, type (for instance, vehicle, pedestrian, bicyclist, etc.), heading, speed of movement relative to the vehicle, etc. To aid in the detection and classification of objects, one or more illuminators may have a combination of IR and visible light to obtain certain color information. Thus, the illuminator may be configured to also emit light in at least part of the visible light spectrum.

As shown in FIG. 3, the perception system 326 includes one or more external sensors 334 for detecting objects external to the vehicle. The sensors 334 are located in one or more sensor units around the vehicle. The detected objects may be other vehicles, obstacles in the roadway, traffic signals, signs, trees, bicyclists, pedestrians, etc. The sensors 334 may also detect certain aspects of weather or other environmental conditions, such as snow, rain or water spray, or puddles, ice or other materials on the roadway.

The perception system 326 also includes other sensors 336 within the vehicle to detect objects and conditions within the vehicle, such as in the passenger compartment and trunk region. For instance, such sensors may detect, e.g., one or more persons, pets, packages, etc., as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). The interior sensors 336 may detect the proximity, position and/or line of sight of the passengers in relation to one or more display devices of the passenger compartment, for example to determine how best to present information to the passengers during a ride.

The raw data obtained by the sensors can be processed by the perception system 336 and/or sent for further processing to the computing devices 302 periodically or continuously as the data is generated by the perception system 336. Computing devices 302 may use the positioning system 322 to determine the vehicle's location and perception system 326 to detect and respond to objects when needed to reach the location safely, e.g., via adjustments made by planner module 324. In addition, the computing devices 302 may perform calibration of individual sensors, all sensors in a particular sensor assembly, or between sensors in different sensor assemblies or other physical housings.

As illustrated in FIGS. 1A-B and 2, certain sensors of the perception system 326 may be incorporated into one or more sensor assemblies or housings outside and inside the vehicle. In one example, these may be integrated into the side-view mirrors on the vehicle. In another example, other sensors may be part of the roof-top housing 102, or other sensor housings or units 106a,b, 108a,b, 112 and/or 116. In further examples, cameras and IR illuminators may be disposed within the vehicle along the headliner, the A, B, C or D pillars, etc. The computing devices 302 may communicate with the sensor assemblies located on or otherwise distributed along the vehicle. Each assembly may have one or more types of sensors such as those described above.

Returning to FIG. 3, computing devices 302 may include all of the components normally used in connection with a computing device such as the processor and memory described above as well as a user interface subsystem 338. The user interface subsystem 338 may include one or more user inputs 340 (e.g., a mouse, keyboard, touch screen and/or microphone) and one or more display devices 342 (e.g., a monitor having a screen or any other electrical device that is operable to display information). In this regard, an internal electronic display may be located within a cabin of the vehicle (e.g., 204 in FIG. 2) and may be used by computing devices 302 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 344 may also be located within the passenger vehicle. The passenger(s) may communication directly with the vehicle via one or more device inputs 346. The inputs 346 may include a touch screen on an internal electronic display, a microphone for receiving spoken instructions, a haptic sensor for receiving physical feedback, etc.

The vehicle also includes a communication system 348. For instance, the communication system 348 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. The communication system 348 may thus include one or more antennas located within the cabin and/or on the vehicle's roof, as well as one or more transceiver modules coupled to the antennas for providing wireless communication.

While the components and systems of FIG. 3 are generally described in relation to a passenger vehicle arrangement, as noted above the technology may be employed with other types of vehicles, such as buses, campers, cargo vehicles, etc. In larger vehicles, the user interface elements such as displays, microphones and speakers may be distributed so that each passenger has his or her own information presentation unit and/or one or more common units that can present status information to larger groups of passengers. Similarly, the interior sensors 336 of the perception system 326 may be arranged (e.g., based on one or more coverage priorities) to have fields of view encompassing different areas throughout the vehicle.

Example Implementations

In view of the structures and configurations described above and illustrated in the figures, various aspects will now be described in accordance with aspects of the technology.

A self-driving vehicle, such as a vehicle with level 4 or level 5 autonomy that can perform driving actions without human operation, has unique requirements and capabilities. This includes making driving decisions based on a planned route, received traffic information, and objects in the external environment detected by the onboard sensors. It also includes determining a status of the vehicle before picking up a passenger, while transporting the passenger to his or her destination, and after the passenger exists the vehicle. In such situations, in order to determine the vehicle status and operate accordingly, the vehicle may rely on sensor data obtained from interior sensors distributed throughout the vehicle, such as in the passenger compartment and trunk.

Figure 4A:
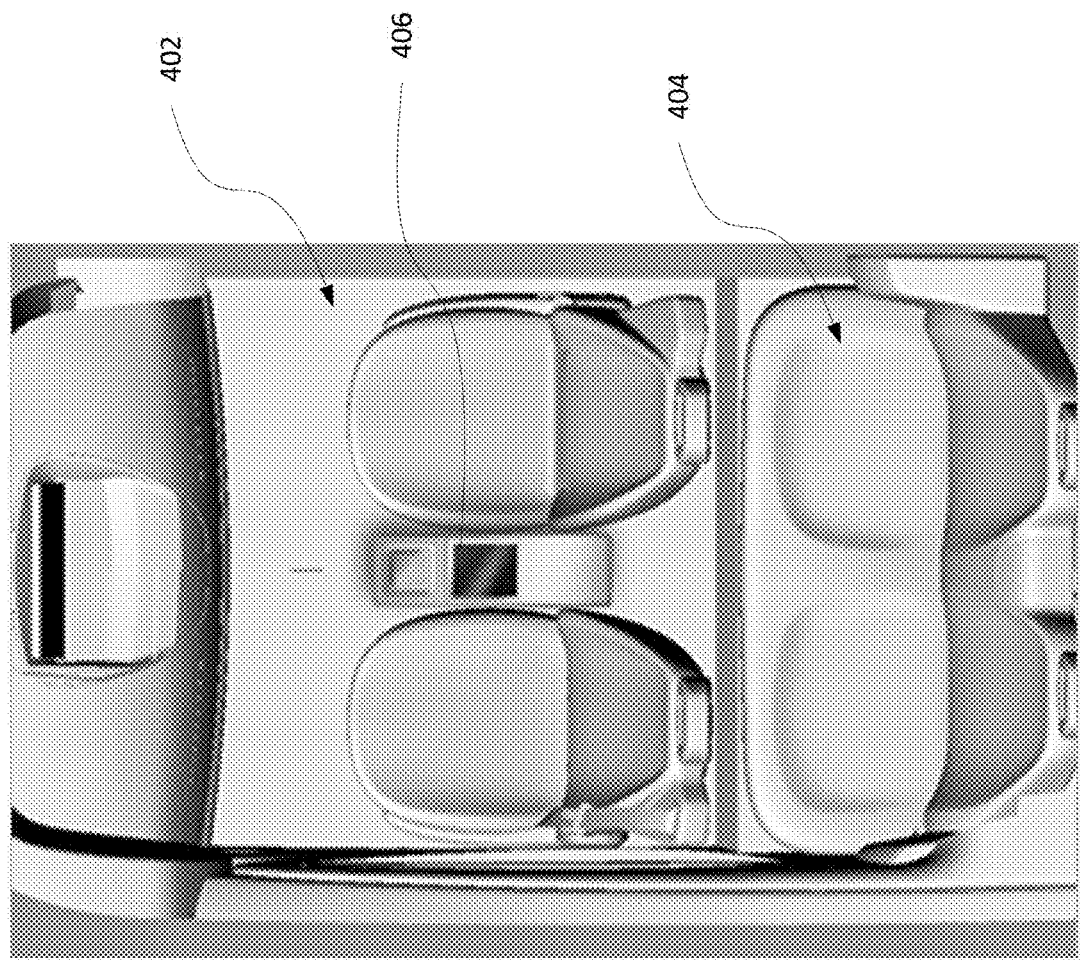
FIGS. 4A-B illustrate example views of interior sections of a vehicle in accordance with aspects of the technology.
Figure 4B:
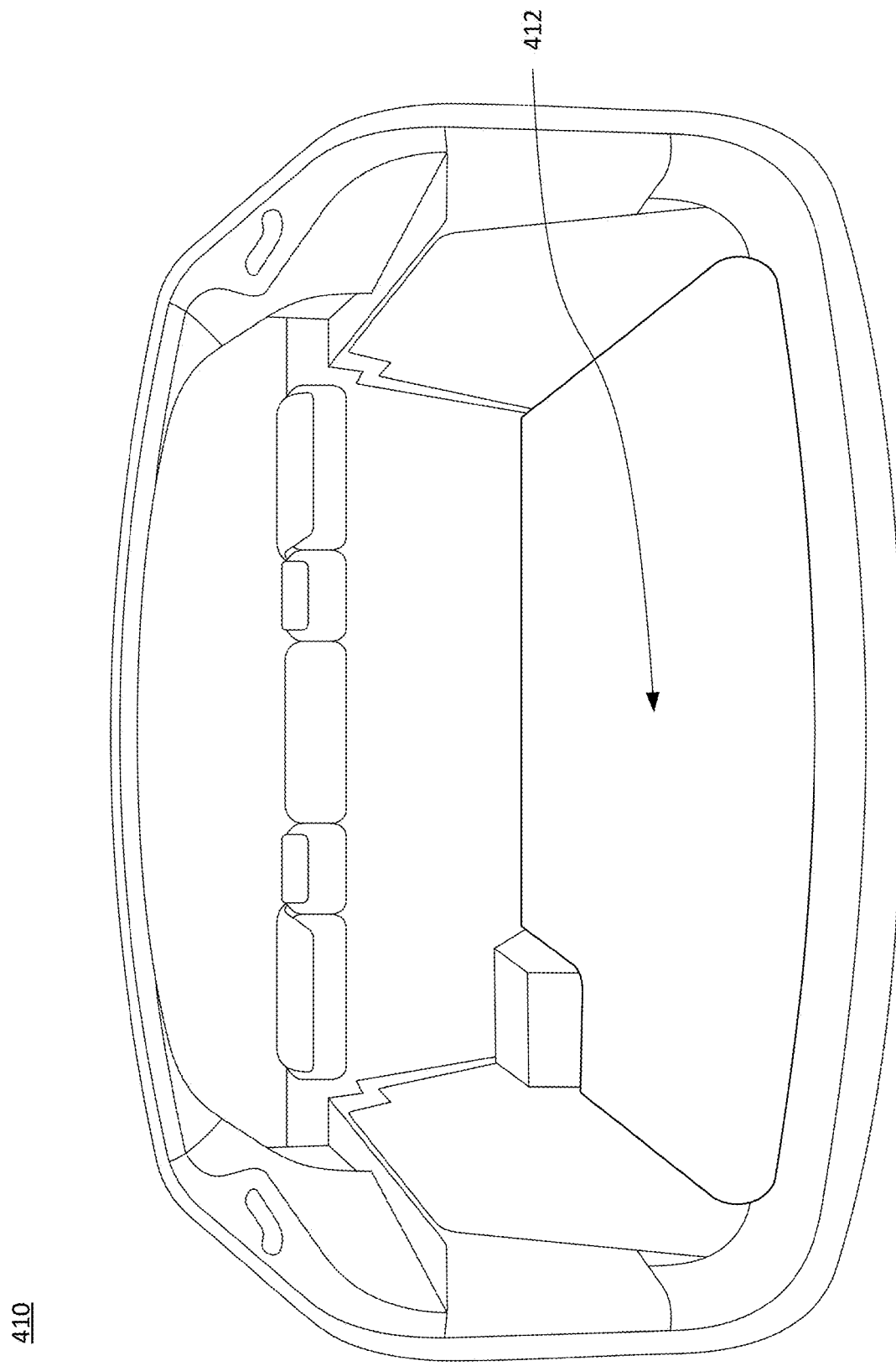

FIG. 4A illustrates a top-down view 400 of a vehicle cabin of an example vehicle, such as vehicle 100 of FIG. 1. As shown, the cabin includes a front seat area 402 and a rear seat area 404. A center console 406 may be disposed between the front seats. FIG. 4B illustrates a perspective view 410 of a trunk region or other cargo space 412 of the vehicle. As noted above, ideally the interior sensor system may have sensors with fields of view that encompass all areas within the vehicle. However, this may not be feasible due to the number of sensors that would be required, as well as the cost of deploying and servicing such sensors. Thus, according to one aspect of the technology, the interior sensor system employs multiple priority levels to cover different regions of the vehicle.

By way of example, there may be three priority levels generally categorized as follows: high priority, medium priority, and low priority. In this example, high priority areas may encompass, e.g., all seat surface (including both lower and upper surfaces), the center console area, the trunk floor surface, and areas adjacent to the trunk such as where a person or their legs would be when leaning into the trunk. The medium priority areas may encompass front and rear floor surfaces. And low priority areas may include storage locations, such as in-door receptacles, seatback compartments, etc. Other scenarios may have two, four or more priority levels.

The priority level for a given area may be used to select the refresh rate and/or resolution of the imagery obtained for that area. By way of example only, a high priority area may have a refresh rate on the order of 0.5-5.0 seconds at a maximum resolution of the imaging device, while a low priority area may have a refresh rate on the order of 30-60 seconds at a lower resolution (e.g., 25-50% of the maximum resolution). A medium priority area may have a refresh rate on the order of 3.0-45 seconds at a medium resolution (e.g., 70-80% of the maximum resolution). These refresh and resolution rates are merely exemplary, and may be lower or higher. In additional or alternatively, the image processing techniques used for the imagery may be tailored to the priority level, region of the vehicle, or other criteria. For instance, for seat areas, the image processing may use training data or other machine learning approaches (e.g., a neural network) that are primarily focused on recognizing people, whereas for storage areas the system may be more tuned to detecting the type of object (e.g., a package, groceries, etc.). There may be different precision recall requirements for different priorities, thereby optimizing compute for the on-board processing system. Alternatively or additionally, based on the different priorities the system could also trigger a request to a remote a customer service group. For instance, if the priority level meets or exceeds a certain threshold, or when there is uncertainty about the image (e.g., on-board processing cannot determine if there is a left item or a mess, or if there is an occupant), the request for remote assistance may be sent. This can include the remote system performing additional object recognition processing on the image of interest or having a remote assistance technician review the image.

Figure 5A:
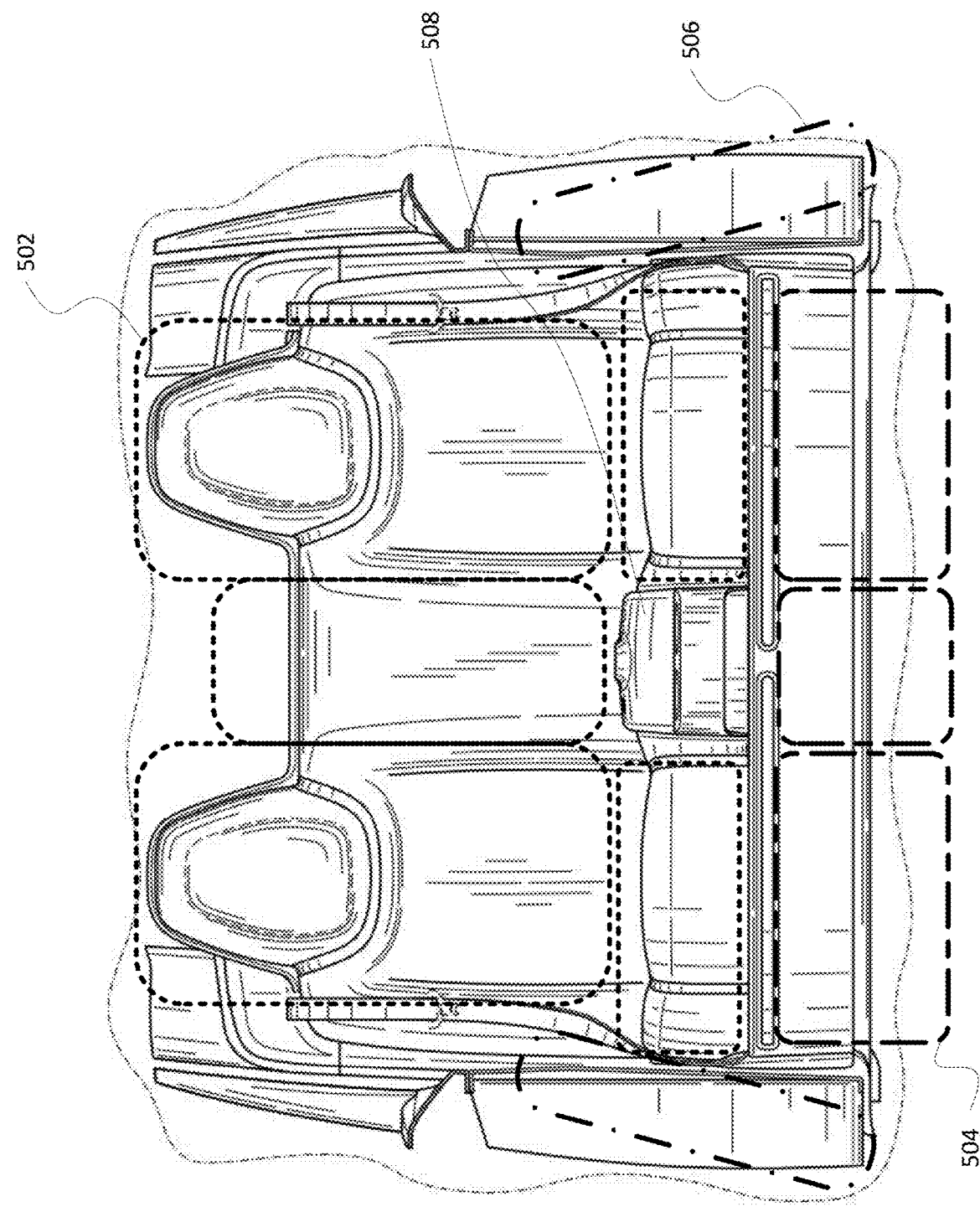
FIGS. 5A-F illustrate vehicle regions and priorities in accordance with aspects of the technology.
Figure 5B:
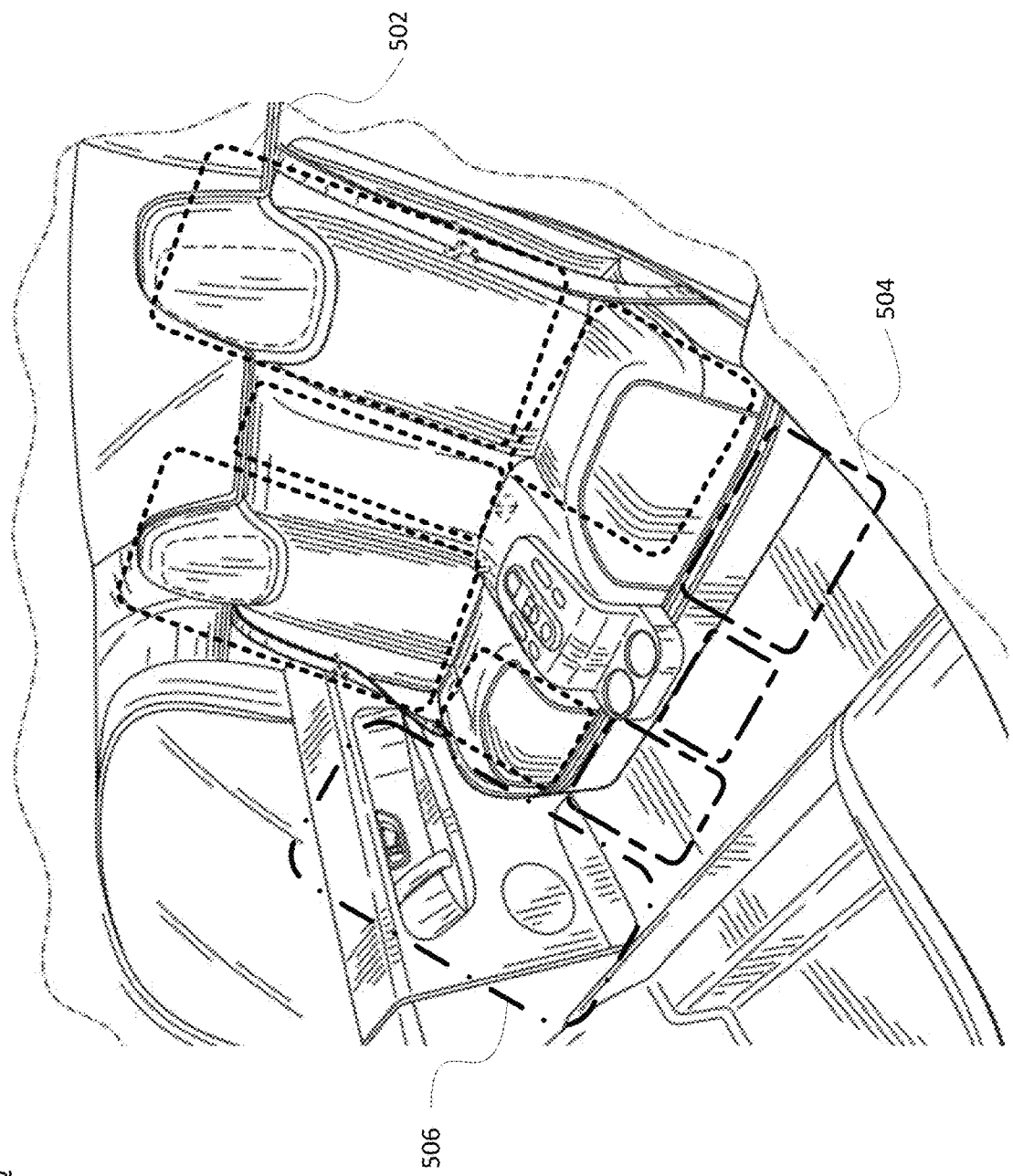

FIGS. 5A-F illustrate different regions of the vehicle cabin and trunk for an exemplary vehicle, such as vehicle 100. Continuing the above example, the regions are shown with three different priority levels for sensor detection. In particular, FIG. 5A presents a first view 500 of the rear seats of the vehicle and FIG. 5B presents a second view 510 of the rear seats. As shown, there are three types of areas, namely areas 502 in dotted lines, areas 504 in dashed lines, and areas 506 in dash-dot lines. A console 508 is also shown between the two rear seats. In this example, areas 502 are high priority, areas 504 are medium priority, and areas 506 are low priority.

Figure 5C:
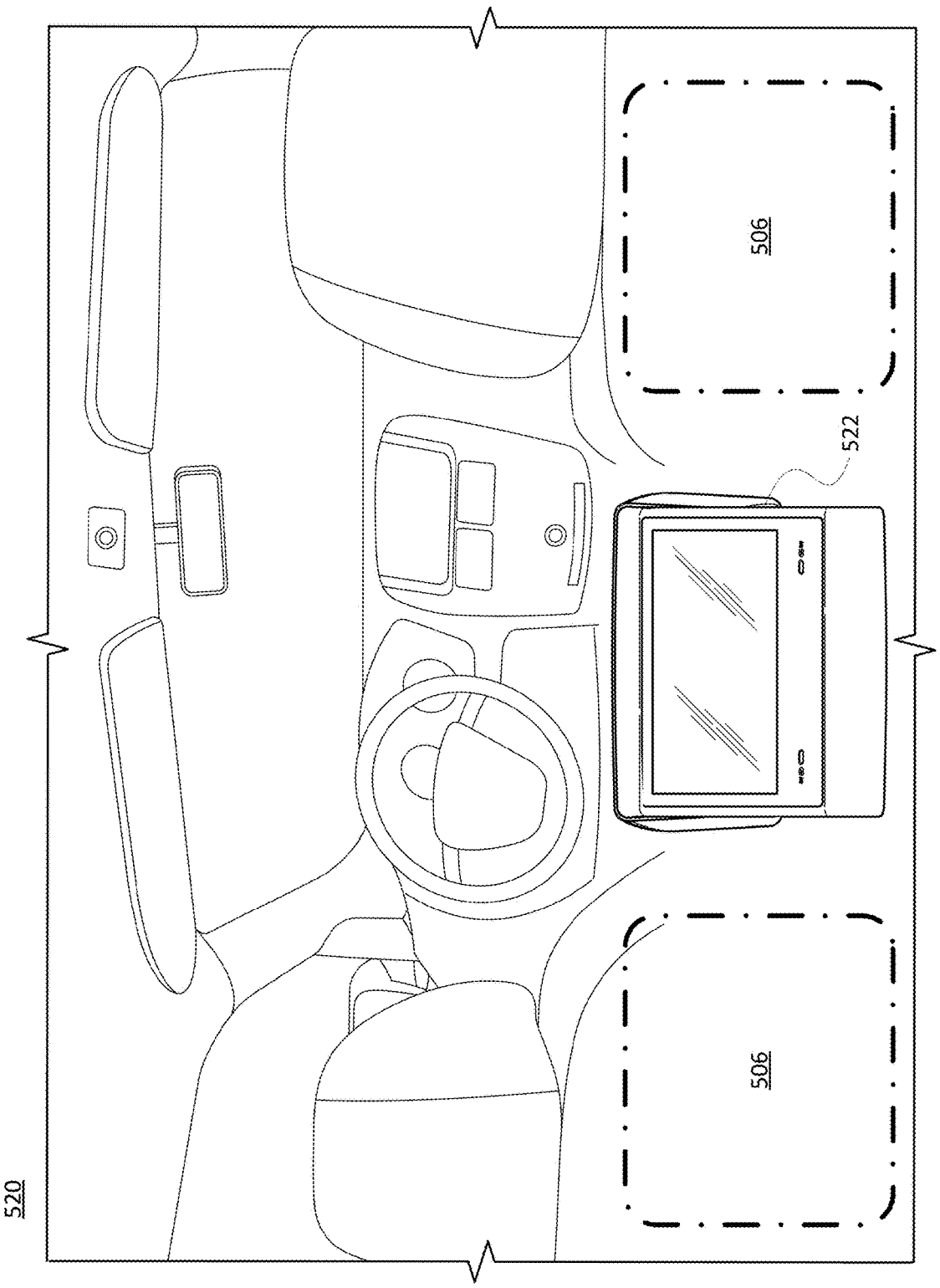
Figure 5D:
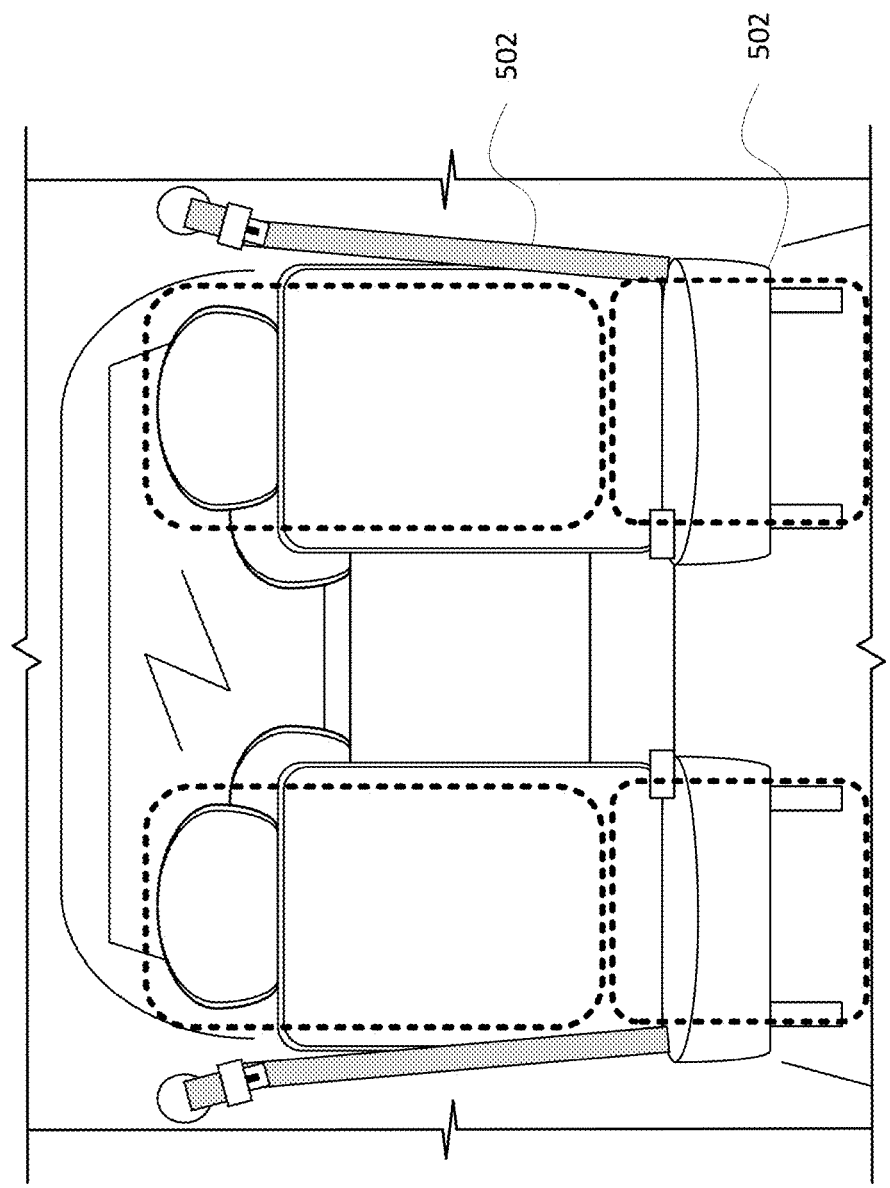
Figure 5E:
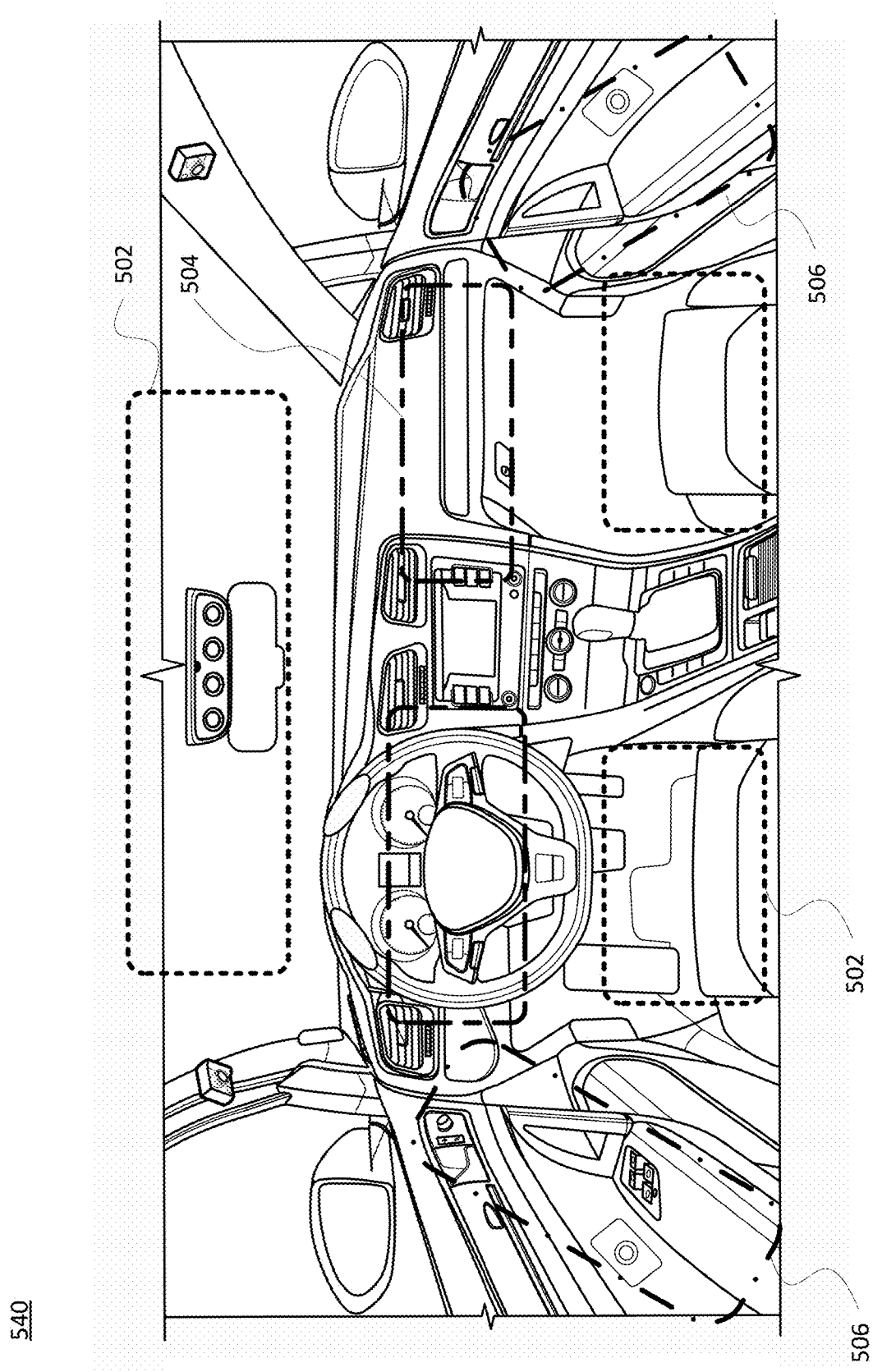
Figure 5F:
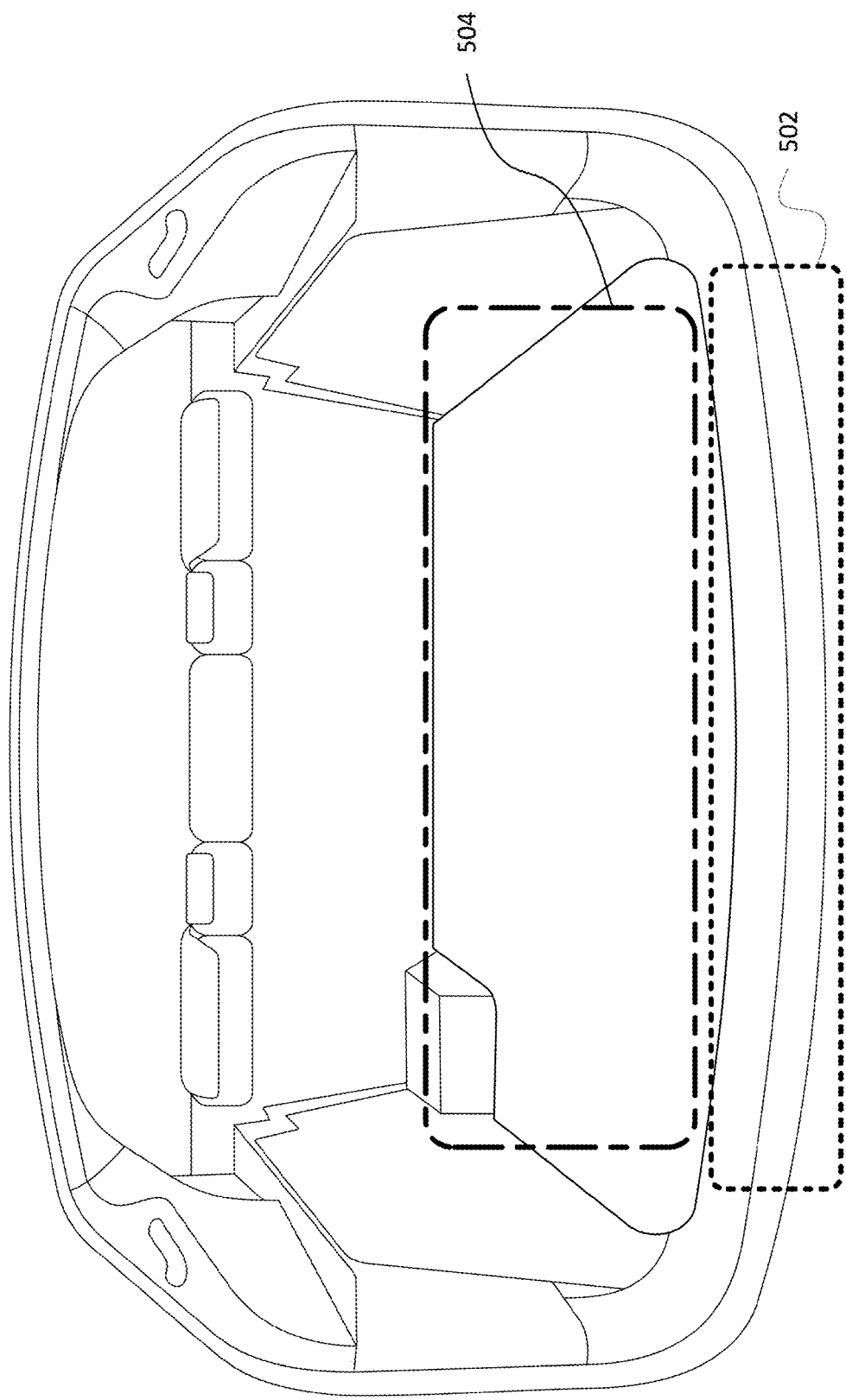

FIG. 5C presents a view 520 of the backs of the front seats of a vehicle. Here, areas 506 on the backs of the front seats are shown in dash-dot lines. Also shown is a console 522, which is positioned between the front seats. In various embodiments one or both consoles 508 and 522 may be within the vehicle or not included at all. FIG. 5D presents a first view 530 of the front seat section of the cabin, facing the seats. FIG. 5E presents a second view 540 of the front seat section from the viewpoint of the passenger(s) facing the front of the vehicle. And FIG. 5F presents a view 550 of a trunk or other storage area of the vehicle (e.g., when the rear seats are folded down). Here, there may be a main cargo area encompassed by dash-dot region 504, and an entrance area encompassed by dashed region 502. The entrance area may be, e.g., where a passenger or other person leans in to place a package in the main cargo area. Coverage of this area may be very important, for instance when the vehicle determines whether to close the trunk.

Visual information detected in each area may be analyzed via an on-board (or remote) processing system for each of the regions. This may be done, for instance, using machine learning techniques to identify if a portion of the cabin differs from a baseline ("clean") configuration. However, the ability to identify such differences may depend on the quality of the data, including sensor resolution. By way of example, one constraint for an optical camera having resolution on the order of 1-4 megapixels (MP) is the ability to detect a matte black object of a predetermined size. For instance, the object may be between 70×40×0.5 mm and 110×90×20 mm. While a higher resolution imager may be able to satisfactorily detect an object smaller than the above examples, this may require an increased amount of onboard processing power and/or data storage. Other constraints may be a low light signal to noise ratio (SNR) of between 5:1 and 15:1 (or more or less), and a stray light rejection ratio on the order of $0.8 \times^{-4}$ to $1.5 \times^{-4}$, for instance with a maximum source radius of no more than ≤6.0°. The higher the stray light rejection ratio, the better the system is able to handle sources of light that could degrade the image quality, for instance due to image flare. This could come from dashboard or window reflections, or from a user device (e.g., cellphone flash turned on, etc.) The radius of the source represents how much space the stray light source is taking in the image.

The different regions and/or different priority levels of the cabin and storage areas can be covered by a set of cameras distributed at various locations. FIG. 2 illustrated one example where cameras and other sensors 206, 208 and/or 210 may be located. In other examples, cameras and IR illuminators (and microphones) may be positioned in other areas of the interior, such as along a pillar (such as an A, B, C or D pillar), in the console, in or adjacent to a door, in a headrest or armrest, etc. Regardless of the exact position, the sensors should be arranged to provide fields of view sufficient to cover the selected areas or zones that are of interest (e.g., the seats, floor, storage places). For example, narrower FOV cameras may be disposed in more places in the vehicle or larger FOV in fewer places. In many scenarios, at least one camera is positioned per row of seating and one camera for the trunk or other cargo space. For vehicles with an aisle, a pair of cameras may be positioned on each side of the aisle per row. Microphones can be positioned to capture in-vehicle audio. This may be used, for instance, to assist the processing system when evaluating captured imagery. Regardless of the placement of the cameras (and microphones), the components need to meet any applicable safety standards, including FMVSS 201U (Occupant Protection in Interior Impact).

In one scenario, there is a least one camera arranged to view the front seat areas, and at least one camera arranged to view the rear seat areas. Additional cameras may be arranged to provide sufficient coverage of the various cabin zones in view of the priority levels as noted above. By way of example, the optical cameras may be fisheye lens-type cameras with IR illumination. For instance, the IR illumination may be on the order of 800 to 1000 nm.

According to one aspect, the IR illumination is able to cover the same field of view as some or all of the cameras. In some examples, IR illuminators are collocated with respective cameras. And in other examples, the illumination devices are not collocated with the cameras. However, one constraint is that the IR illuminator(s) be placed so that the illumination does not degrade the image quality (due to flare). For instance, the IR illuminator(s) may be under the same constraint as for stray light rejection.

In some situations IR illumination can affect color accuracy. This could potentially affect the ability to correctly recognize a detected object in an image. Thus, in one aspect the cameras may be calibrated to maximize the color accuracy. The IR illumination for in-cabin cameras may be activated based on ambient light conditions within the main cabin, whether the vehicle's headlights are on, and/or other criteria. For a camera(s) viewing the trunk area, there may be no IR illumination, IR illumination triggered according to ambient light conditions in the trunk, or IR illumination only during a pre- or post-ride vehicle check.

Pre- and/or post-ride vehicle checks may be performed for the cabin area and/or the trunk using the various cameras and illuminators. Additional checks may be performed during a ride (e.g., "mid-ride" checks). How such mid-ride checks are performed may depend on time of day, driving conditions, vehicle configurations and/or other factors. For example, at night or other low-ambient light situations, interior visible cabin lights should not be turned on to perform a check, since this can be distracting to the passenger(s) and could also degrade the imagery taken by the camera(s). Whether the vehicle has a solid roof, a moon roof or a sunroof may also affect the imaging approach. In one example, the exposure time for a given check may be on the order of 50-150 ms (e.g., 100 ms) or more or less. An auto exposure algorithm may be used to define the gain and exposure time for each camera. This will account for the amount of ambient light and potential flaring from stray light sources.

The interior sensors may be employed in various use situations, which generally fall into pre-ride situations, post-ride situations, and mid-ride while transporting one or more passengers to their destination(s).

Imagery from the cameras (and potentially audio from the microphones) may be communicated to the on-board vehicle control system via a wired link (e.g., power over data line) or a wireless link. Then the system may perform real-time object recognition, for instance via machine learning techniques, to identify different conditions or situations, such as a passenger being improperly buckled, an object has been inadvertently left in the vehicle, cleaning is required, whether certain areas are clear (e.g., so that the trunk door can be closed or a window rolled up), and whether someone in the driver's seat has their hands on the steering wheel. Alternatively or additionally, certain imagery may be sent to a remote assistance service for processing. For example, the remote assistance service may have more processing resources or a more robust machine learning image processing technique that can identify specific items or other objects in the vehicle.

Figure 6A:
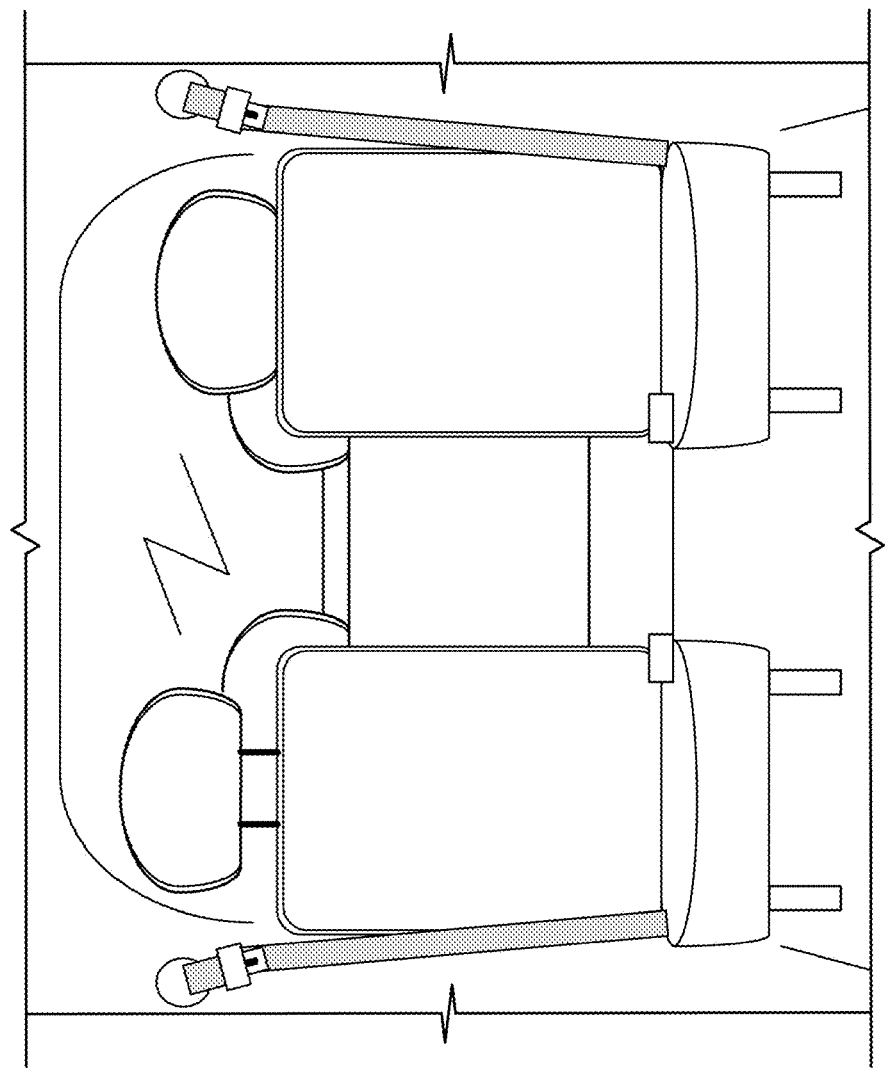
FIGS. 6A-B illustrate an example of a pre-ride check in accordance with aspects of the technology.
Figure 6B:
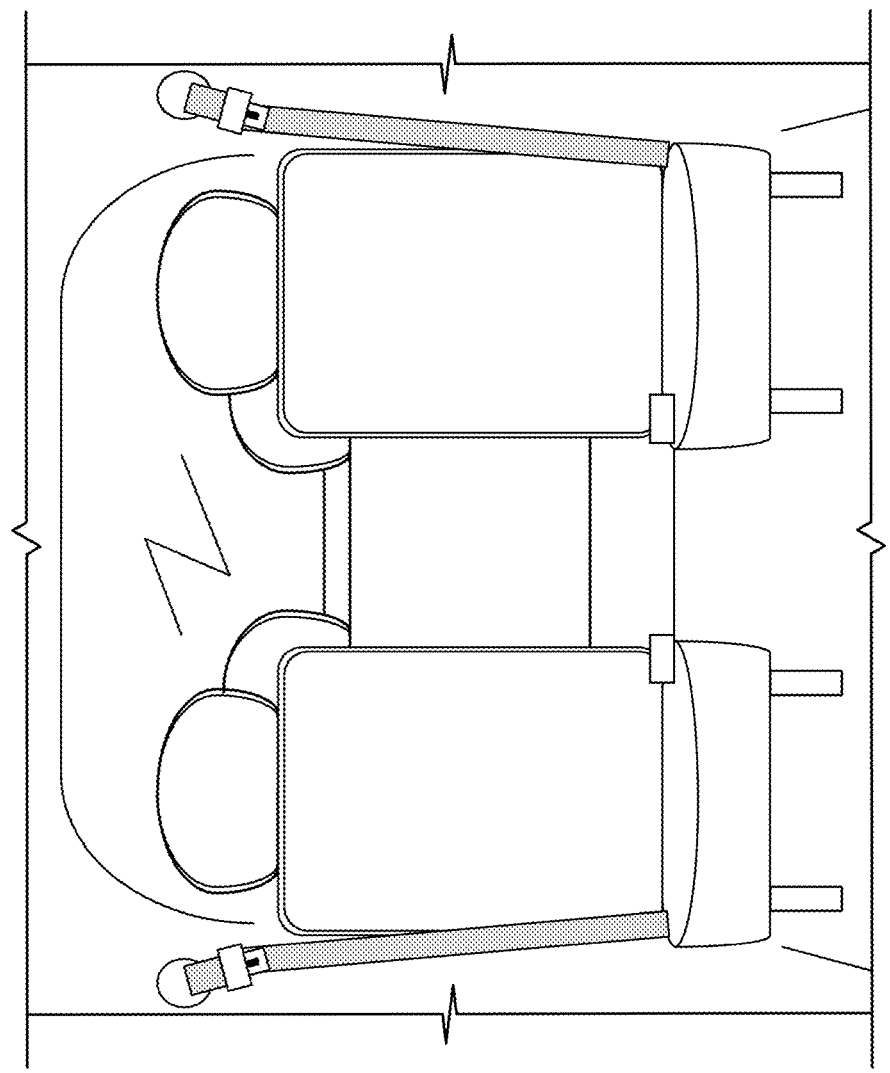

By way of example, in a pre-ride situation, the control system may confirm that the cabin is clean for the next rider and/or confirm the cabin is in a starting state condition (e.g. seats are in a nominal position). If the cabin is not clear, the control system may contact a service center to schedule a cleaning before the next pickup. If that is not possible, prospective passengers may be alerted, ride fees may be adjusted, etc. If the seats are not in the starting state condition, then the control system may cause one or more actuators or other seat assemblies to adjust the seats accordingly, for instance by moving a seat forward or backward, adjusting the recline angle, headrest height, etc. Similar adjustments may be made for window or steering wheel positioning, etc. Alternatively or additionally, such adjustment may be performed based on user preferences of the passenger(s) to be picked up next. FIGS. 6A-B illustrate one example of seat adjustment. As shown in FIG. 6A, the headrest of the front passenger seat may be fully extended from a prior rider. The control system may lower the headrest to a default height before the next pickup, as shown in FIG. 6B.

Figure 7A:
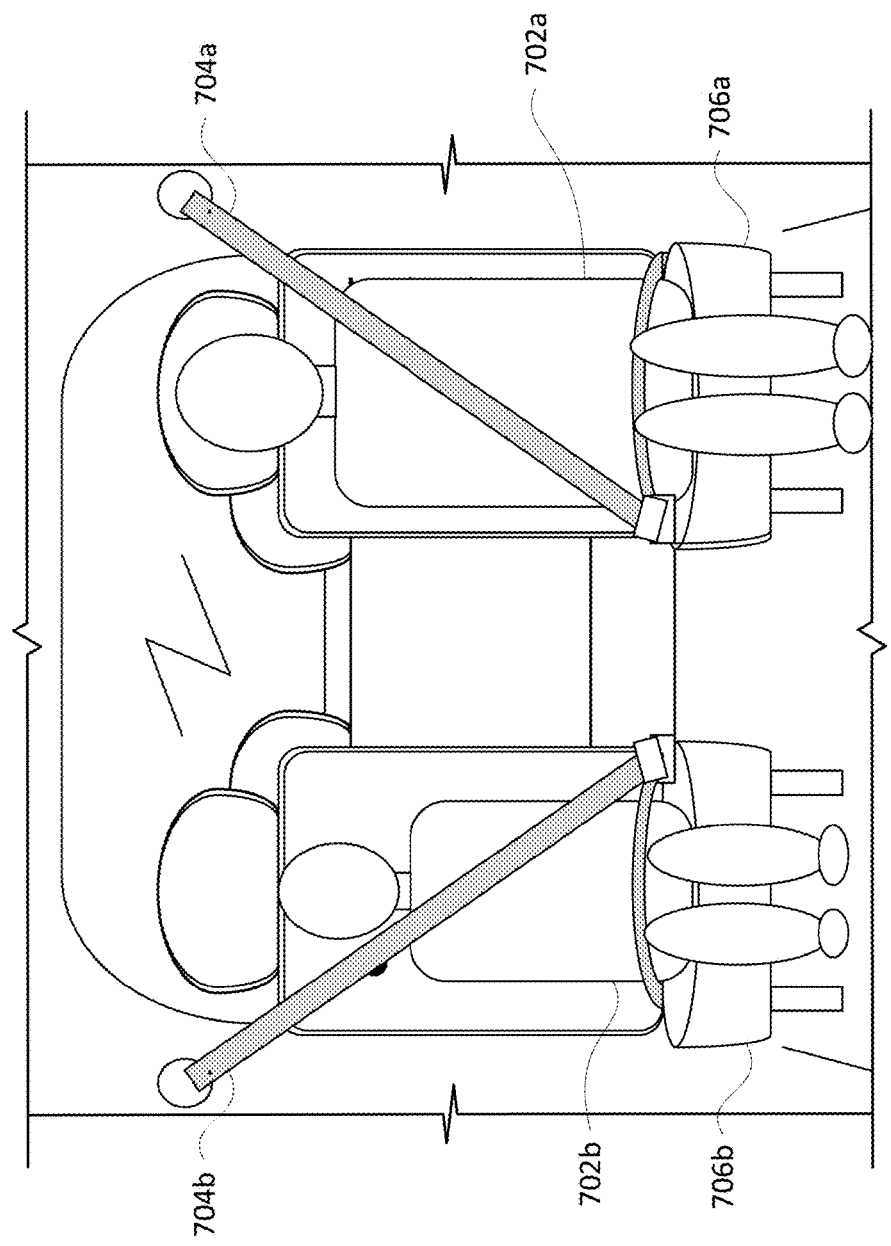
FIGS. 7A-B illustrates an example of a mid-ride check in accordance with aspects of the technology.
Figure 7B:
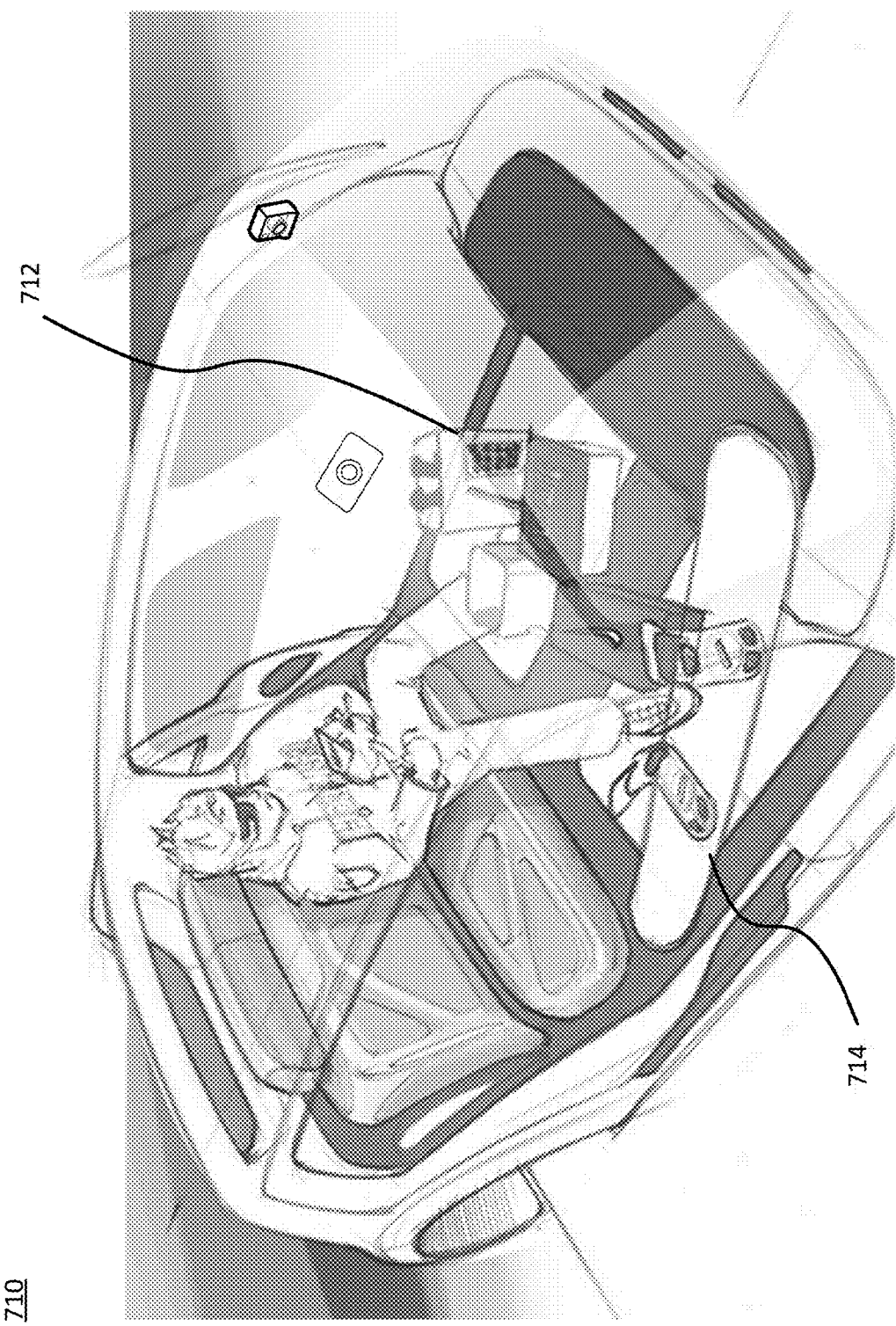

During a ride (e.g., "mid-ride"), as the vehicle is operating in an autonomous driving mode, the control system may confirm that riders are properly seated and belted, confirm the number of riders based on the trip request, determine seats used, and/or observe rider behavior such as in response to certain driving operations, etc. By way of example, FIG. 7A illustrates a view 700. Based on obtained imagery, the control system may determine that there are two passengers 702a, 702b in the front seats, and that the seatbelts 704a, 704b are properly buckled. The system may also determine current seat configurations 706a, 706b, for instance to compare against the default seat positions pre-ride. And as shown in 710 of FIG. 7B, the system may determine whether there are any packages 712 or other objects 714 located in the cabin (or the trunk). This information can be used in the post-ride phase, for example to check that riders have exited the vehicle, check that the vehicle was left in a clean condition, and to check for items left behind. At the ride's conclusion, the onboard system may remind passengers to take all their belongings with them. However, should something be left behind, the post-ride check identifies it. At this point, the vehicle may send a message to the user's device regarding the left item. The message may indicate when and where the item may be retrieved. Alternatively or additionally, the vehicle may correspond with a remote assistance service to notify it about the left item. This can include scheduling a stop at a service facility or other location so that the item may be removed from the vehicle and stored until the user can retrieve it. Should the post-ride check indicate that the vehicle needs cleaning or other service (e.g., if the windows or headrests cannot be returned to a default position), the vehicle may schedule a service or otherwise adjust its planned route accordingly. Furthermore, the cameras may also be used to determine user sentiment or for other user experience research. This can include using the cameras to learn what seats are most preferred by passengers for a given vehicle or seating configuration. This information may be employed when selecting and dispatching vehicles for rider pickups, to adjust camera placement and FOV, etc.

As explained above, the vehicle may communicate directly with the passengers via its user interface system, or indirectly via its communication system. In the latter case, information may be communicated to or received from an app on the customer's mobile phone or other computing device. Such communication by the vehicle be done during the ride, as well as pre- and/or post-ride.

Figure 8A:
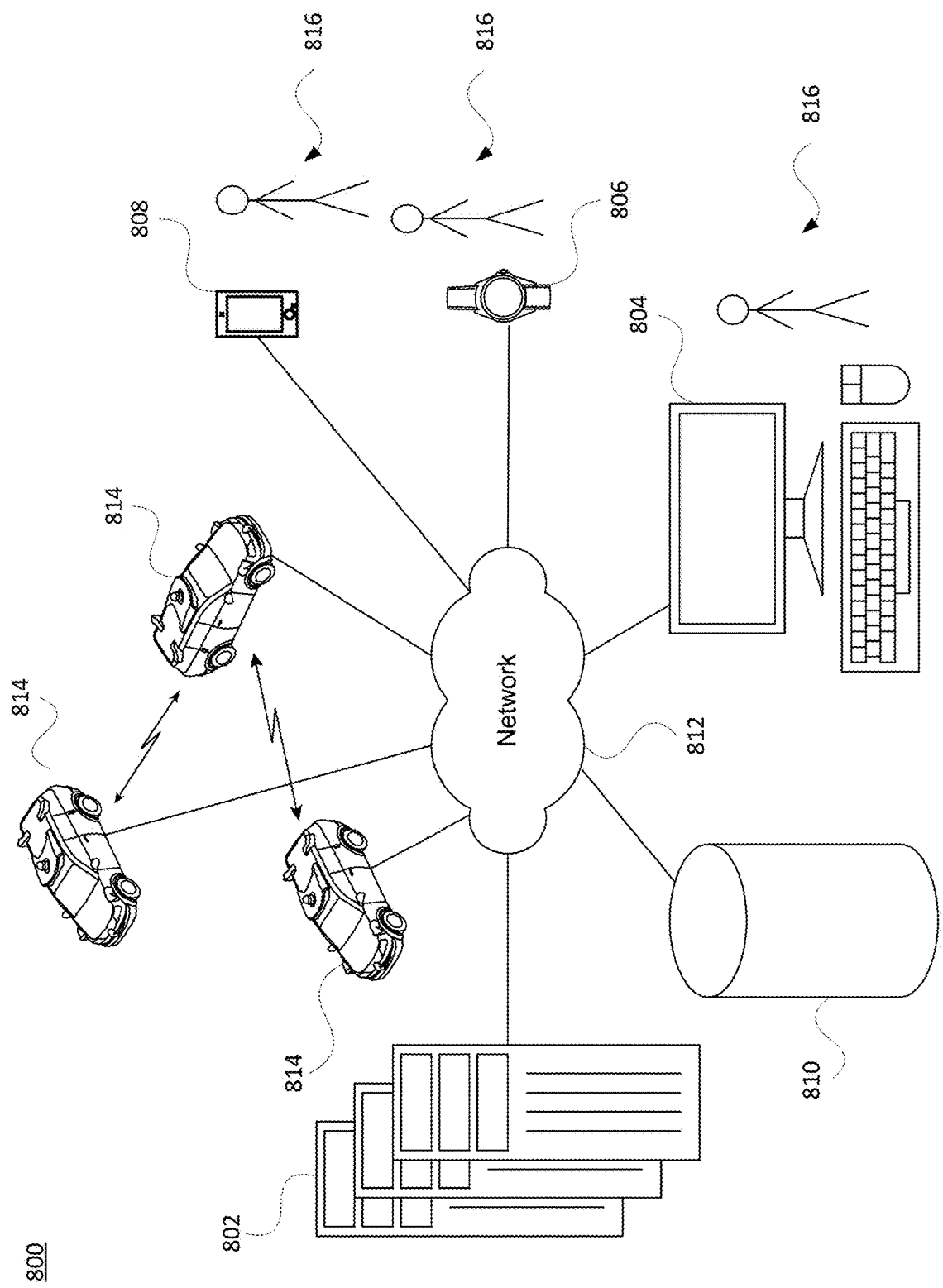
FIGS. 8A-B illustrates an example system in accordance with aspects of the technology.
Figure 8B:
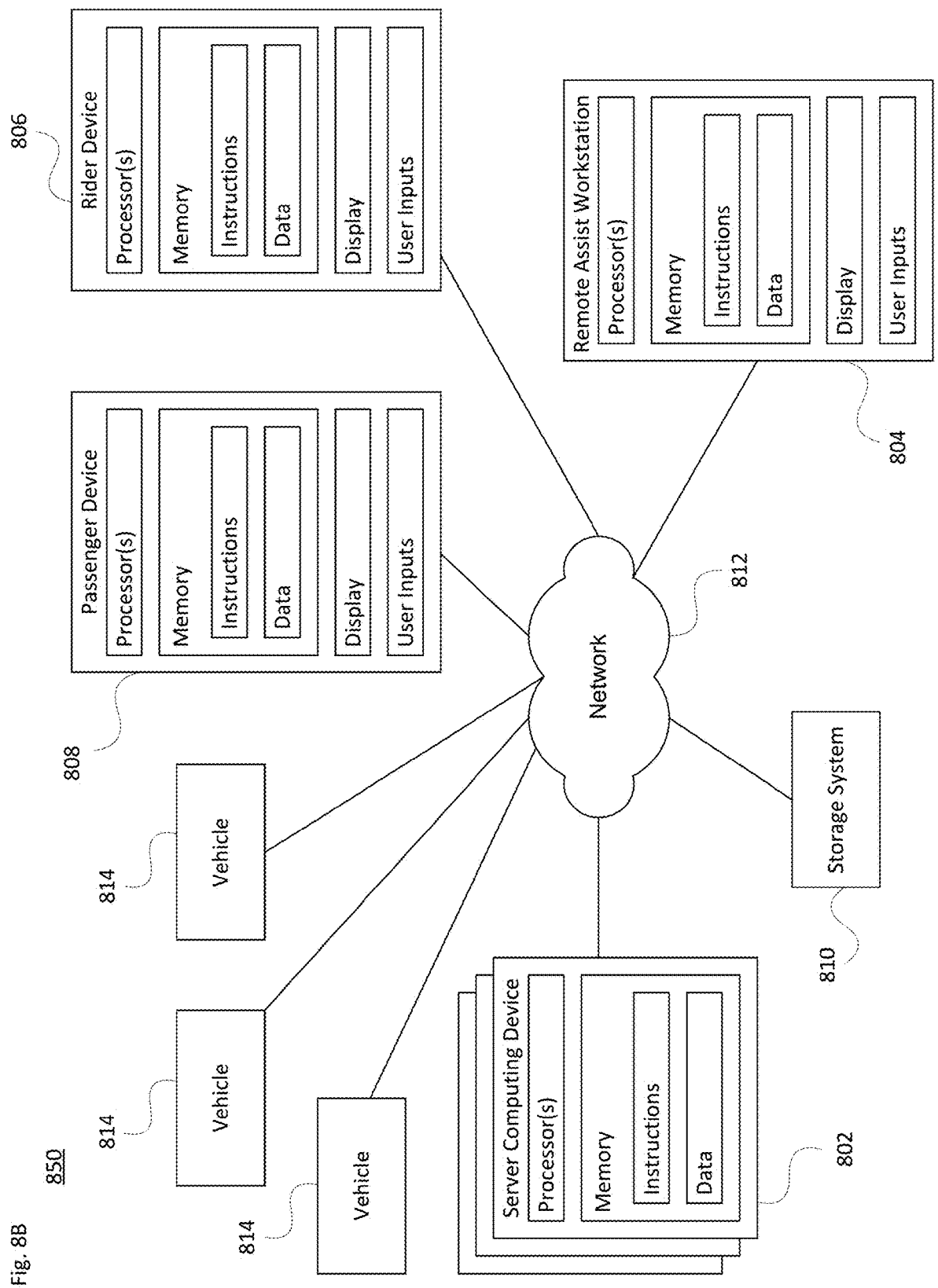

FIGS. 8A-B illustrate general examples of how information may be communicated between the vehicle and the user.

In particular, FIGS. 8A and 8B are pictorial and functional diagrams, respectively, of an example system 800 that includes a plurality of computing devices 802, 804, 806, 808 and a storage system 810 connected via a network 812. System 800 also includes vehicles 814, which may be configured the same as or similarly to vehicles 100 of FIGS. 1A-B. Vehicles 814 may be part of a fleet of vehicles. Although only a few vehicles and computing devices are depicted for simplicity, a typical system may include significantly more.

As shown in view 850 of FIG. 8B, each of computing devices 802, 804, 806 and 808 may include one or more processors, memory, data and instructions. Such processors, memories, data and instructions may be configured similarly to the ones described above with regard to FIG. 3. The various computing devices and vehicles may communication via one or more networks, such as network 812. The network 812, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 814, as well as computing devices 804, 806 and 808 via the network 812. For example, vehicles 814 may be a part of a fleet of vehicles that can be dispatched by a server computing device to various locations. In this regard, the computing device 802 may function as a dispatching server computing system which can be used to dispatch vehicles to different locations in order to pick up and drop off passengers or to pick up and deliver cargo. In addition, server computing device 802 may use network 812 to transmit and present information to a user of one of the other computing devices or a passenger of a vehicle. In this regard, computing devices 804, 806 and 808 may be considered client computing devices.

As shown in FIG. 8A each client computing device 804, 806 and 808 may be a personal computing device intended for use by a respective user 816, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another. As indicated in FIG. 8B, device 808 may be the device of a passenger who is currently in the vehicle, while device 806 may be the device of a rider awaiting pickup.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with passengers of dispatched vehicles, or users awaiting pickup. Although only a single remote assistance workstation 804 is shown in FIGS. 8A-B, any number of such workstations may be included in a given system. Moreover, although workstation 804 is depicted as a desktop-type computer, the workstation 804 may include various types of personal computing devices such as laptops, netbooks, tablet computers, etc.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 812 as shown in FIGS. 8A-B, and/or may be directly connected to or incorporated into any of the computing devices. The remote assistance service or the server computing device may be used to provide enhanced image processing. For example, they may have more robust machine learning models than the onboard system, which can detect and categorize (classify) more types of objects. Based on this categorization, the system may tailor the message to the passenger or other user about the item (e.g., an audible announcement that the user's cell phone has fallen under the seat, or a message sent to an app on the user's device that a package has been left in the trunk and can be picked up at a service center).

The vehicle or remote assistance may communicate directly or indirectly with the passengers' client computing devices. Here, for example, information may be provided to the passengers regarding current driving operations, changes to the route in response to the situation, whether to buckle up, caution about packages or other objects left in the vehicle, etc.

Figure 9:
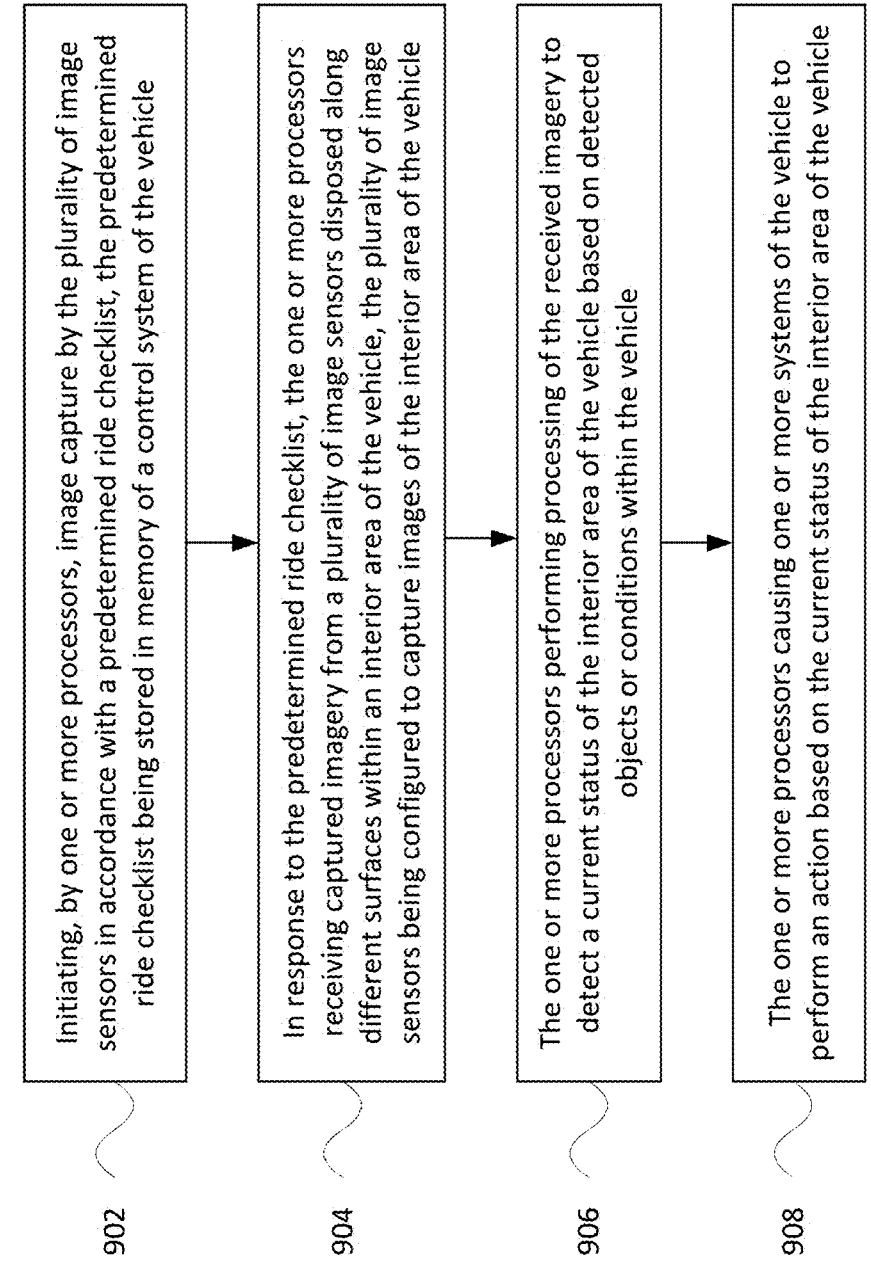
FIG. 9 illustrates an example method in accordance with aspects of the technology.

FIG. 9 illustrates a method of operation in accordance with the foregoing. In particular, it illustrates a flow diagram 900 of a method of controlling an interior sensing system for a vehicle configured to operate in an autonomous driving mode. At block 902, one or more processors initiate image capture by the plurality of image sensors in accordance with a predetermined ride checklist. The predetermined ride checklist is stored in memory of a control system of the vehicle. At block 904, in response to the predetermined ride checklist, the one or more processors receive captured imagery from a plurality of image sensors disposed along different surfaces within an interior area of the vehicle. The plurality of image sensors is configured to capture images of the interior area of the vehicle. At block 906, the one or more processors perform processing of the received imagery to detect a current status of the interior area of the vehicle based on detected objects or conditions within the vehicle. And at block 908, the one or more processors cause one or more systems of the vehicle to perform an action based on the current status of the interior area of the vehicle.

Finally, as noted above, the technology is applicable for various types of vehicles, including passenger cars, buses, RVs and trucks or other cargo carrying vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A system for a vehicle configured to operate in an autonomous driving mode, the system comprising:
    an image sensor disposed within an interior area of the vehicle, the image sensor being configured to capture images of at least one zone of a set of zones within the interior area of the vehicle, each zone of the set of zones having a respective priority level; and
    a processing system operatively coupled to the image sensor, the processing system configured to:
        initiate image capture by the image sensor;
        compare imagery obtained by the image capture against a baseline cleanliness configuration to determine a cleanliness condition of the zone within the interior area of the vehicle; and
        based on the comparison, either (i) cause the vehicle to schedule a cleaning service, (ii) send a request for remote assistance regarding the cleanliness condition, or (iii) cause a planning system of the vehicle to plan a change in route in the autonomous driving mode.

2. The system of claim 1, wherein either (i) cause the vehicle to schedule the cleaning service or (ii) send the request for remote assistance regarding the cleanliness condition includes schedule a cleaning of the vehicle prior to performance of a next pickup operation by the vehicle.

3. The system of claim 1, wherein the determination of the cleanliness condition includes a determination of whether any items were left behind by a rider in one or more zones of the set of zone.

4. The system of claim 3, wherein the processing system is further configured to, responsive to a determination that an item was left behind, cause the planning system to plan the change in route in the autonomous driving mode, the change in route including scheduling of a stop at a service facility or other location so that the item that was left behind can be removed from the vehicle.

5. The system of claim 1, wherein the comparison of the imagery is further based on an observation of rider behavior.

6. The system of claim 1, wherein the processing system is further configured to compare the imagery using machine learning.

7. The system of claim 1, wherein the set of zones includes:
    a first zone having a first priority level corresponding to (a) a first image capture rate or (b) a first image resolution, and
    a second zone having a second priority level corresponding to (a) a second image capture rate different than the first image capture rate or (b) a first image resolution different than the first image resolution.

8. A method, comprising:
    initiating, by a processing system of a vehicle configured to operate in an autonomous driving mode, image capture by an image sensor disposed within an interior area of the vehicle, the image sensor being configured to capture images of at least one zone of a set of zones within the interior area of the vehicle, each zone of the set of zones having a respective priority level;

comparing, by the processing system, imagery obtained by the image capture against a baseline cleanliness configuration to determine a cleanliness condition of the zone within the interior area of the vehicle; and based on the comparing, either (i) causing the vehicle to schedule a cleaning service, (ii) sending a request for remote assistance regarding the cleanliness condition, or (iii) causing a planning system of the vehicle to plan a change in route in the autonomous driving mode.

9. The method of claim 8, wherein either (i) causing the vehicle to schedule the cleaning service or (ii) sending the request for remote assistance regarding the cleanliness condition includes scheduling a cleaning of the vehicle prior to performance of a next pickup operation by the vehicle.

10. The method of claim 8, wherein determining the cleanliness condition includes determining whether any items were left behind by a rider in one or more zones of the set of zones.

11. The method of claim 8, wherein comparing the imagery is further based on an observation of rider behavior during operation in the autonomous driving mode.

12. A sensing system for a vehicle configured to operate in an autonomous driving mode, the sensing system comprising:

an image sensor disposed within an interior area of the vehicle, the image sensor having a field of view configured to capture imagery within the interior area of the vehicle, the field of view also being configured to encompass an external area adjacent to the vehicle; and a processing system operatively coupled to the image sensor, the processing system configured to:

initiate image capture by the image sensor;

evaluate imagery obtained by the image capture to detect an object outside of the vehicle in the external area;

based on the evaluation, identify one or more characteristics of the object, including whether the object includes a person; and in response to the identification cause a system of the vehicle to perform a selected action in the autonomous driving mode.

13. The sensing system of claim 12, wherein detection of the object outside of the vehicle in the external area includes detection of the person adjacent to the vehicle.

14. The sensing system of claim 12, wherein:

detection of the object outside of the vehicle in the external area includes detection of the person adjacent to a storage area of the vehicle; and the selected action involves closing of a trunk of the vehicle or closing of a window of the vehicle.

15. The sensing system of claim 12, wherein initiation of image capture by the image sensor includes initiation of infrared illumination of at least a portion of the external area.

16. The sensing system of claim 12, further comprising one or more acoustical sensors, wherein:

evaluation of the imagery obtained by the image capture to detect the object outside of the vehicle in the external area is further based on audio information obtained by the one or more acoustical sensors.

17. The sensing system of claim 12, wherein the selected action includes either closing a trunk lid or closing a window of the vehicle.

18. A method, comprising:

initiating, by a processing system of a vehicle configured to operate in an autonomous driving mode, image capture by an image sensor of the vehicle, the image sensor being disposed within an interior area of the vehicle, the image sensor having a field of view configured to capture imagery within an interior area of the vehicle, the field of view also being configured to encompass an external area adjacent to the vehicle;

evaluating, by the processing system, imagery obtained by the image capture to detect an object outside of the vehicle in the external area;

based on the evaluating, the processing system identifying one or more characteristics of the object, including whether the object includes a person; and in response to the identifying, the processing system causing a system of the vehicle to perform a selected action in the autonomous driving mode.

19. The method of claim 18, wherein the selected action includes either closing a trunk lid or closing a window of the vehicle.

20. The method of claim 18, wherein evaluating the imagery includes detecting the person adjacent to a storage area of the vehicle.

21. The method of claim 18, wherein initiating image capture by the image sensor includes initiating infrared illumination of at least a portion of the external area.

22. The method of claim 18, wherein evaluating the imagery obtained by the image capture to detect the object outside of the vehicle in the external area is further based on audio information obtained by one or more acoustical sensors of the vehicle.

* * * * *